United States Patent
Yamasaki

(10) Patent No.: US 10,237,708 B2
(45) Date of Patent: Mar. 19, 2019

(54) TERMINAL DEVICE, CONTROL METHOD, AND RECORDING MEDIUM STORING CONTROL PROGRAM

(71) Applicant: NEC Corporation, Minato-ku, Tokyo (JP)

(72) Inventor: Yasuhiro Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 15/325,484

(22) PCT Filed: Jul. 17, 2015

(86) PCT No.: PCT/JP2015/003611
§ 371 (c)(1),
(2) Date: Jan. 11, 2017

(87) PCT Pub. No.: WO2016/013189
PCT Pub. Date: Jan. 28, 2016

(65) Prior Publication Data
US 2018/0199183 A1    Jul. 12, 2018

(30) Foreign Application Priority Data
Jul. 23, 2014    (JP) .................................. 2014-150041

(51) Int. Cl.
*G06F 13/00*    (2006.01)
*H04L 12/24*    (2006.01)
(Continued)

(52) U.S. Cl.
CPC ............ *H04W 4/203* (2013.01); *G06F 13/00* (2013.01); *H04L 41/046* (2013.01);
(Continued)

(58) Field of Classification Search
CPC ....... H04L 41/02–41/048; H04L 41/08–41/50; H04L 45/52–45/748;
(Continued)

(56) References Cited

U.S. PATENT DOCUMENTS 4,470,128 A    9/1984 Higdon
5,659,794 A *  8/1997 Caldarale ................ H04L 29/06
                                                    709/234

(Continued)

FOREIGN PATENT DOCUMENTS

JP    S58-062888 A    4/1983

OTHER PUBLICATIONS

V. Cerf, et al., "Delay-Tolerant Networking Architecture", IETF RFC4838, Apr. 2007, pp. 1-35.
(Continued)

*Primary Examiner* — Timothy J Weidner

(57) ABSTRACT

In a network system in which a plurality of data utilizing networks are present, in order to achieve both prevention of data spread across different data utilizing networks and an increase in the number of terminals configuring a data forwarding network, a terminal device that reproduces and forwards data by the store-and-forward system determines participation in a data forwarding network and a data utilizing network by managing network control information for network control and data access control information for data access control simultaneously with data.

14 Claims, 14 Drawing Sheets

(51) Int. Cl.
| | |
|---|---|
| *H04L 12/781* | (2013.01) |
| *H04L 12/947* | (2013.01) |
| *H04L 29/06* | (2006.01) |
| *H04W 4/20* | (2018.01) |
| *H04W 4/40* | (2018.01) |
| *H04W 8/02* | (2009.01) |
| *H04W 8/24* | (2009.01) |
| *H04W 12/02* | (2009.01) |
| *H04W 28/02* | (2009.01) |
| *H04W 40/22* | (2009.01) |
| *H04W 48/02* | (2009.01) |
| *H04W 48/08* | (2009.01) |
| *H04W 48/16* | (2009.01) |
| *H04W 84/00* | (2009.01) |
| *H04W 84/18* | (2009.01) |
| *H04W 88/06* | (2009.01) |
| *H04W 88/10* | (2009.01) |
| *H04W 92/10* | (2009.01) |

(52) U.S. Cl.
CPC .......... *H04L 41/0803* (2013.01); *H04L 45/52* (2013.01); *H04L 49/252* (2013.01); *H04L 69/18* (2013.01); *H04L 69/26* (2013.01); *H04W 4/40* (2018.02); *H04W 8/02* (2013.01); *H04W 8/24* (2013.01); *H04W 12/02* (2013.01); *H04W 28/0247* (2013.01); *H04W 40/22* (2013.01); *H04W 48/02* (2013.01); *H04W 48/08* (2013.01); *H04W 48/16* (2013.01); *H04W 84/005* (2013.01); *H04W 84/18* (2013.01); *H04W 88/06* (2013.01); *H04W 88/10* (2013.01); *H04W 92/10* (2013.01)

(58) Field of Classification Search
CPC .... H04L 49/252; H04L 49/90–49/9094; H04L 69/18–69/329; H04W 4/02–4/046; H04W 4/20–4/203; H04W 4/40–4/48; H04W 8/18–8/265; H04W 12/02–12/10; H04W 24/02–24/04; H04W 28/0247; H04W 28/26; H04W 48/02–48/20; H04W 80/06–80/12; H04W 84/005; H04W 84/18–84/22; H04W 88/02; H04W 88/04–88/12; H04W 92/10; H04W 92/12
See application file for complete search history.

(56) References Cited

U.S. PATENT DOCUMENTS

| | | | |
|---|---|---|---|
| 6,427,173 B1* | 7/2002 | Boucher | G06F 5/10 709/230 |
| 2013/0080567 A1* | 3/2013 | Pope | G06F 13/385 709/213 |
| 2017/0078729 A1* | 3/2017 | Karlsson | H04L 67/12 725/75 |

OTHER PUBLICATIONS

Masato Tsuru, et al, "Delay Tolerant Networking Technology—The Latest Trends and Prospects", IEICE communications society magazine, No. 16 [Spring Issue], 2011, pp. 57-68. (Cited in the Specification and ISR).

International Search Report for PCT Application No. PCT/JP2015/003611, dated Oct. 13, 2015.

English translation of Written Opinion for PCT Application No. PCT/JP2015/003611, Written opinion published on Jan. 28, 2016.

* cited by examiner

Fig. 2

| | NETWORK 1 (SSID1) | NETWORK 2 (SSID2) | NETWORK 3 (SSID3) |
|---|---|---|---|
| DATA FORWARDING NETWORK | TERMINAL A<br>TERMINAL C<br>TERMINAL D<br>TERMINAL E | TERMINAL B<br>TERMINAL C<br>TERMINAL D<br>TERMINAL F | TERMINAL C<br>TERMINAL D |
| DATA UTILIZING NETWORK | TERMINAL A<br>TERMINAL C<br>TERMINAL E | TERMINAL B<br>TERMINAL F | TERMINAL C<br>TERMINAL D |

TERMINAL DEVICE, CONTROL METHOD, AND RECORDING MEDIUM STORING CONTROL PROGRAM

This application is a National Stage Entry of PCT/JP2015/003611 filed on Jul. 17, 2015, which claims priority from Japanese Patent Application 2014-150041 filed on Jul. 23, 2014, the contents of all of which are incorporated herein by reference, in their entirety.

TECHNICAL FIELD

The present invention relates to a terminal device that reproduces and forwards data by the store-and-forward system, a control method, and a recording medium storing a control program.

BACKGROUND ART

Communication technology called DTN (Delay Tolerant Networking) is known (see, for example, NPLs 1 and 2). DTN is one of techniques of computer networking for obtaining a method for coping with technical problems under extreme environments or mobile environments under which continuous network connection is impossible. In DTN, for various network forwarding techniques, inter-nodes (for example, terminals) are routed by the store-and-forward system and asynchronously exchange messages having arbitrary lengths.

In general communication such as TCP/IP (Transmission Control Protocol/Internet Protocol) communication, communication between a transmission terminal and a reception terminal is performed only when end-to-end connectivity is established between these two terminals.

In contrast to this, in DTN, the end-to-end connectivity does not need to be always established between a transmission terminal and a reception terminal in transmitting data. In DTN, data is transmitted only up to a relay terminal in the middle having end-to-end connectivity with the transmission terminal. In DTN, the relay terminal has the function of accumulating data. When the relay terminal is connected to a terminal that holds no data accumulated in the relay terminal upon movement of the relay terminal or a change in network connection state, the relay terminal transmits data accumulated in itself to the terminal. Repeating such operations results in end-to-end information transmission over time even if the transmission terminal and the reception terminal have no end-to-end connectivity between them at the moment data is transmitted.

CITATION LIST

Non Patent Literature

[NPL 1]
V. Cerf, et al., "Delay-Tolerant Networking Architecture," IETF RFC4838, April 2007
[NPL 2]
Tsuru, Uchida, Takine, Nagata, Matsuda, Miwa, and Yamamura, "Delay Tolerant Networking Technology—The Latest Trends and Prospects," IEICE communications society magazine, No. 16 [Spring], 2011

SUMMARY OF INVENTION

Technical Problem

FIG. 14 is a diagram of a general network, for explaining the Background Art. In FIG. 14 and the following description, "physics" means a physical group of terminals that performs DTN communication. A "data forwarding network" means a group of terminals (network) that performs data relay in DTN. A "data utilizing network" means a group of terminals (network) that can utilize forwarded information. Referring to FIG. 14, six terminals A1, A2, A3, B1, B2, and B3 are present as a physical group of terminals, in which terminals A1, A2, and A3 configure a data utilizing network for automobiles and terminals B1, B2, and B3 configure a data utilizing network for mobile phones.

The existing DTN has no mechanism for separating one delay tolerant network into a plurality of networks (in the existing mechanism, data relay is performed without distinguishing pieces of information depending on from which network the information is obtained, after data reception). Normally, to prevent, for example, billing constraints or information leakage, individual data utilizing networks are prohibited from arbitrarily utilizing data on other data utilizing networks without authorization. In other words, it is necessary to prevent endless data spread across different data utilizing networks.

When a plurality of data utilizing networks are present, a data forwarding network and a data utilizing network need to be designed to include the same group of terminals so as to separate data utilized in each network. More specifically, in the case of FIG. 14, a data forwarding network for automobiles formed by terminals A1, A2, and A3 and a data forwarding network for mobile phones formed by terminals B1, B2, and B3 are separately provided.

With such design, two networks are completely separated so that terminals present in one network may not be connected to terminals present in the other network. More specifically, referring to FIG. 14, the terminals belonging to the network for automobiles may not transmit data to the terminals belonging to the network for mobile phones, while the terminals belonging to the network for mobile phones may not transmit data to the terminals belonging to the network for automobiles. In other words, data does not endlessly spread across different data utilizing networks.

However, in the separation method as described above, the data forwarding network is completely separated into two data forwarding networks. For example, in the case of FIG. 14, the data forwarding network is separated into a data forwarding network for automobiles formed by three terminals (A1, A2, and A3) and a data forwarding network for mobile phones formed by three terminals (B1, B2, and B3). In other words, although six terminals (A1, A2, A3, B1, B2, and B3) capable of performing DTN communication are present, the number of data forwarding networks used is three.

When only a small number of terminals configure a data forwarding network, it may take a long time for data to arrive at a target reception terminal, or there is a possibility that data may not arrive at a target reception terminal in the worst case.

In other words, in the existing DTN technology, each terminal has no option but to participate in both a data forwarding network and a data utilizing network or not to participate in both networks. In the existing DTN technology, therefore, it is difficult to simultaneously achieve both prevention of data spread across different data utilizing networks and an increase in the number of terminals configuring a data forwarding network.

The present invention has been made in order to solve the above-described problem, and has as its object to provide a terminal device, a control method, and a recording medium storing a control program, which can achieve both prevention of data spread across different data utilizing networks and an increase in the number of terminals configuring a data forwarding network, in a network system including a plurality of data utilizing networks.

Solution to Problem

A terminal device of the present invention is a terminal device that reproduces and forwards data by a store-and-forward system, wherein the device determines participation in each of a data forwarding network and a data utilizing network by managing network control information for network control and data access control information for data access control simultaneously with data.

A control method of the present invention is a control method for controlling a terminal device that reproduces and forwards data by a store-and-forward system and the method comprises: determining participation in each of a data forwarding network and a data utilizing network by managing network control information for network control and data access control information for data access control simultaneously with data.

A recording medium of the present invention stores a control program which causes a computer of a terminal device that reproduces and forwards data by a store-and-forward system to perform process for determining participation in each of a data forwarding network and a data utilizing network by managing network control information for network control and data access control information for data access control simultaneously with data.

Advantageous Effect of Invention

The present invention can achieve both prevention of data spread across different data utilizing networks and an increase in the number of terminals configuring a data forwarding network, in a network system including a plurality of data utilizing networks.

BRIEF DESCRIPTION OF DRAWINGS

FIG. 2 is a table illustrating a list of terminals configuring a data forwarding network and a list of terminals configuring a data utilizing network, for each network (each SSID) in the first exemplary embodiment.

DESCRIPTION OF EMBODIMENTS

A feature common to each following exemplary embodiment lies in that a terminal that reproduces and forwards data by the store-and-forward system determines terminals that participate in each of a data forwarding network and a data utilizing network by managing two pieces of information concerning network control and data access control simultaneously with data.

First Exemplary Embodiment

The feature of a first exemplary embodiment of the present invention lies in that a data forwarding network and a data utilizing network are controlled by managing each data using control information (network control information and data access control information) within each terminal without adding the control information to forwarding data itself.

(Network Configuration)

Figure 1:
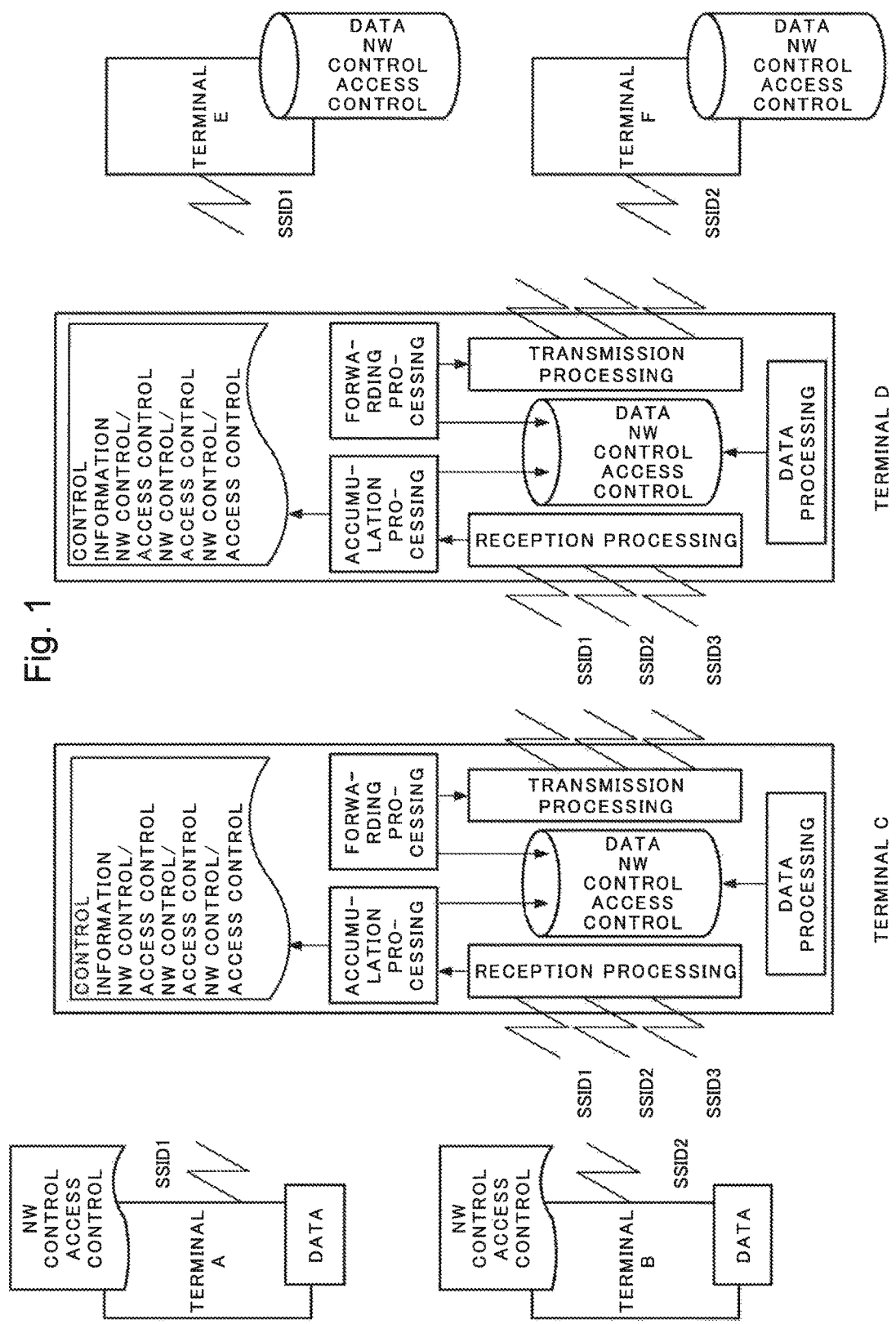
FIG. 1 is a diagram illustrating an exemplary network configuration according to a first exemplary embodiment of the present invention.

FIG. 1 is a diagram illustrating an exemplary network configuration according to the first exemplary embodiment. This network includes six terminals (terminals A to F). Although FIG. 1 illustrates each of the internal configurations of the terminals C and D, the internal configurations of all terminals A to F are the same. Therefore, like terminals C and D, the terminals other than terminals C and D perform data reception processing, data transmission processing, and data accumulation processing.

First, as a precondition, in the present exemplary embodiment, network control is distinguished by the SSID (Service Set Identifier) of a wireless LAN (Local Area Network). Further, for the sake of a clearer description of data access control, all accesses are permitted in the "Available" case, while only partial accesses are permitted in the "Not Available" case. In the foregoing description, all accesses are data reading, data writing, data forwarding, data reception, and data transmission. Partial accesses are data forwarding, data reception, and data transmission among all the accesses mentioned above. In other words, in the "Not Available" case, data reading and data writing are impossible.

Under the above-mentioned precondition, more specifically, each terminal is set, for example, as follows.

Terminal A can be connected to only a network having SSID1 for network control. Terminal A can utilize data of the network having SSID1 for data access control.

Terminal B can be connected to only a network having SSID2 for network control. Terminal B can utilize data of the network having SSID2 for data access control.

Terminal C can be connected to networks having SSID1, SSID2, and SSID3 for network control. Terminal C can utilize data of each of the networks having SSID1 and SSID3 but may not utilize data of the network having SSID2, for data access control.

Terminal D can be connected to the networks having SSID1, SSID2, and SSID3 for network control. Terminal D can utilize data of the network having SSID3 but may not utilize data of each of the networks having SSID1 and SSID2, for data access control.

Terminal E can be connected to the network having SSID1 for network control. Terminal E can utilize data of the network having SSID1 for data access control.

Terminal F can be connected to the network having SSID2 for network control. Terminal F can utilize data of the network having SSID2 for access control.

Upon summing up the above-mentioned results, data forwarding networks and data utilizing networks formed by terminals A to F are set as illustrated in FIG. 2. FIG. 2 is a table illustrating a list of terminals configuring a data forwarding network and a list of terminals configuring a data utilizing network, for each network (each SSID) in the first exemplary embodiment.

Figure 3:
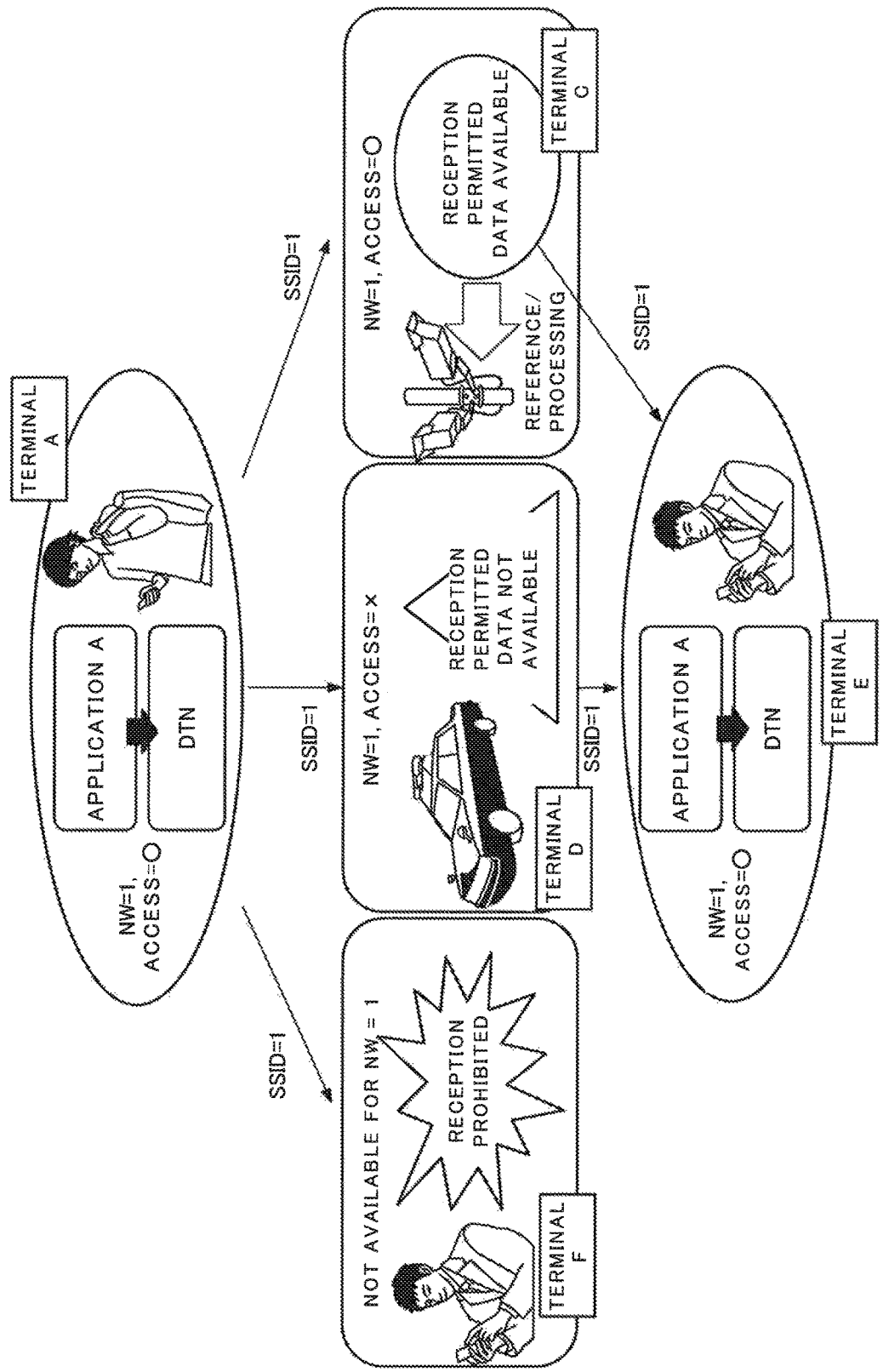
FIG. 3 is a diagram for explaining exemplary flow of data within a group of terminals configuring network 1 (SSID1) in FIG. 2.

FIG. 3 is a diagram for explaining exemplary flow of data within a group of terminals configuring network 1 (SSID1) in FIG. 2. Terminal A may not be connected to terminal F, but can be connected to terminals C and D. Terminal C can utilize data received from terminal A, but the terminal D may not utilize data received from terminal A. Terminal E can receive data from terminals C and D, or terminal A and can utilize the data of terminals A and C among the received data. In other words, referring to FIG. 3, the data forwarding network for SSID1 is formed by terminals A, C, D, and E and the data utilizing network for SSID1 is formed by terminals A, C, and E. Therefore, terminal D can forward data but may not utilize the data in network 1.

Figure 4:
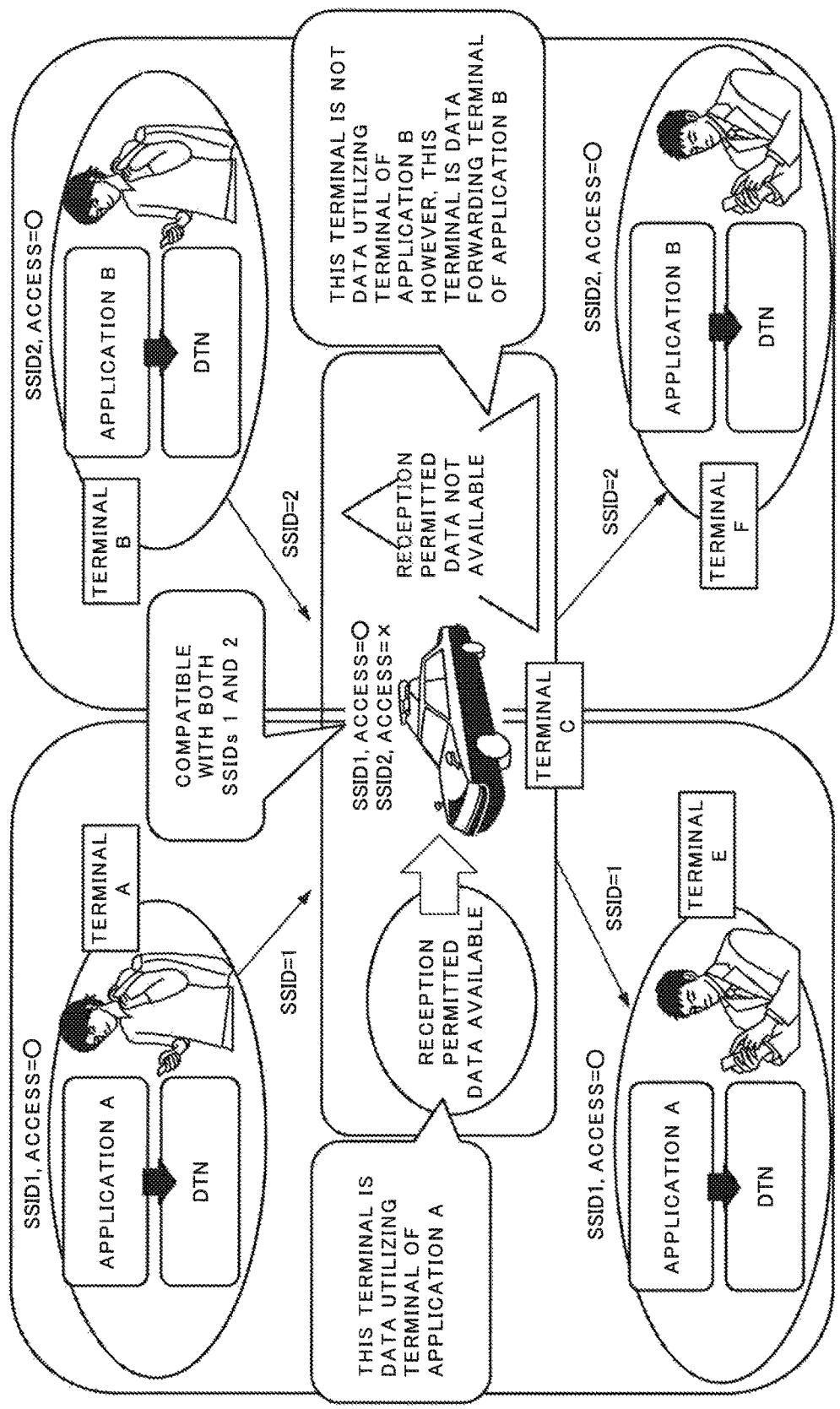
FIG. 4 is a diagram for explaining exemplary flow of data for terminal C in FIG. 2.

FIG. 4 is a diagram for explaining exemplary flow of data for terminal C in FIG. 2. Terminal C can participate in data forwarding networks having both SSID1 and SSID2. However, the terminal C may not utilize data of the network having SSID2. In other words, terminal C can participate in the data utilizing network having SSID1 but may not participate in the data utilizing network having SSID2.

(Configuration of Terminal)

As described above, communication in which a data forwarding network and a data utilizing network are not the same is achieved by managing two pieces of information concerning network control and data access control in combination for data using each terminal. A configuration for managing two pieces of information concerning network control and data access control in combination for data using each terminal will be described hereinafter.

As described in the beginning of the first exemplary embodiment, a mechanism in which no pieces of information concerning network control and data access control is added to data itself is employed in the first exemplary embodiment. Therefore, control information including network control information and access control information is stored and managed only within the terminal, as illustrated in FIG. 1.

Figure 5:
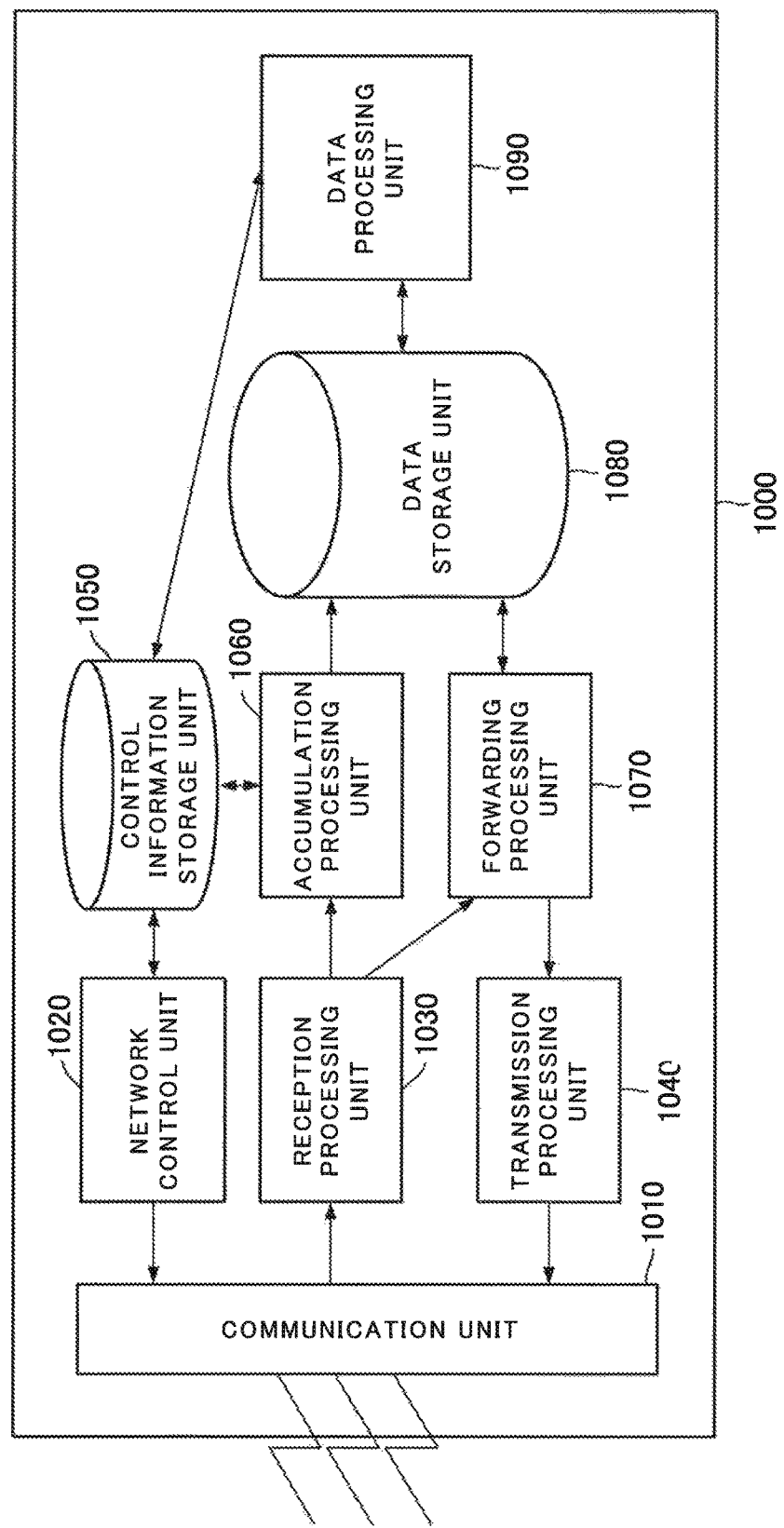
FIG. 5 is a block diagram illustrating an exemplary configuration of a terminal according to the first exemplary embodiment.

FIG. 5 is a block diagram illustrating an exemplary configuration of a terminal 1000 according to the first exemplary embodiment. The terminal 1000 corresponds to terminals A to F illustrated in FIGS. 1 and 2.

The terminal 1000 includes a communication unit 1010, a network control unit 1020, a reception processing unit 1030, a transmission processing unit 1040, a control information storage unit 1050, an accumulation processing unit 1060, a forwarding processing unit 1070, a data storage unit 1080, and a data processing unit 1090.

The communication unit 1010 exchanges data with another terminal via a wireless or wired communication network. The communication unit 1010 performs network setting on the basis of instructions from the network control unit 1020. Examples of the network setting may include designation of the SSID of a wireless LAN. The communication unit 1010 communicates with another terminal only when the network control information of data matches with the network setting (for example, the SSID is matched). The network setting includes communication permission/prohibition and ON/OFF of the communication unit 1010.

Upon receiving data from another terminal, the communication unit 1010 provides the received data with network control information (for example, the SSID) indicating the type of network setting that has been set by the network control unit 1020 and used to receive this data, and transmits this data and the network control information to the reception processing unit 1030.

On the other hand, in transmitting data to another terminal, the communication unit 1010 receives data to be transmitted provided with control information from the transmission processing unit 1040. When the network control information included in the control information matches with the network setting (when, for example, the SSID is matched), the communication unit 1010 transmits data to be transmitted to another terminal.

The network control unit 1020 performs network setting for the communication unit 1010. For example, the network control unit 1020 sets, for the communication unit 1010, static information (that is, network control information) stored in the control information storage unit 1050. Typically, when, for example, three SSIDs (SSID1, SSID2, and SSID3) have been stored in the control information storage unit 1050, these three SSIDs are set. The number of SSIDs to be set is not limited to the above-mentioned number, as a matter of course. When only one SSID has been set in the control information storage unit 1050, the number of SSIDs set for the communication unit 1010 is one. When a plurality of SSIDs have been set in the control information storage unit 1050, not all SSIDs but at least one SSID selected on the basis of a predetermined selection criterion may even be set.

The network control unit 1020 may further perform network setting for the communication unit 1010 by holding as dynamic information, a change in state (the position information, the remaining power level, the remaining storage capacity/memory size, or the communication state (communication band, packet loss, delay, or radio field intensity)) of the terminal 1000 and combining the held dynamic information and the above-mentioned static information with each other. Assuming, for example, that the SSID is used as static information and the remaining power level is used as dynamic information, if the remaining power level is equal to or higher than a certain value, a designated SSID may be set for the communication unit 1010 by the network control unit 1020, but if the remaining power level is equal to or lower than a certain value, an instruction indicating "Communication Prohibited" or the like may be sent to the communication unit 1010.

The reception processing unit 1030 performs reception processing of data received by the communication unit 1010. The reception processing includes processing when data sent from another terminal is received and processing when a control signal is sent upon an encounter with another terminal. The control signal means herein a signal indicating that another terminal has been encountered and also serves as a signal for prompting the terminal 1000 to forward accumulated data. Examples of the control signal include beacon information generated by another terminal, a data list held by another terminal, or the like. Regardless of the reception details, normal protocol reception processing is performed in data reception processing. For example, DTN header processing is performed in DTN, and TCP header processing (for example, count processing of sequence numbers) is performed in TCP. After protocol reception processing is performed, in the case of the data reception, the reception processing unit 1030 passes data provided with network control information to the accumulation processing unit 1060. On the other hand, in the case of a control signal indicating that another terminal has been encountered, the reception processing unit 1030 passes a control signal provided with network control information to the forwarding processing unit 1070.

The transmission processing unit 1040 performs transmission processing of "transmittable data" (to be described later) transmitted from the forwarding processing unit 1070. Processing of transmitting all transmittable data, or processing of transmitting in sequence the data in accordance with a predetermined order of priority or transmitting only the partial data, for example, is performed. In transmitting data, the transmission processing unit 1040 transmits to the communication unit 1010, data as received from the forwarding processing unit 1070 (that is, in the state in which the data is provided with network control information).

The control information storage unit 1050 stores at least one piece of control information. Each piece of control information includes network control information and data access control information. Examples of the network control information may include an SSID. Examples of the data access control information may include each of data read permission/prohibition information, data write permission/prohibition information, data forwarding permission/prohibition information, data reception permission/prohibition information, data transmission permission/prohibition information, and a combination of these pieces of permission/prohibition information. As a specific example of records, all accesses (data reading, data writing, data forwarding, data reception, and data transmission) are permitted for SSID1, partial accesses (data forwarding, data reception, and data transmission) are permitted for SSID2, and partial accesses (only data transmission) are permitted for SSID3, and the like.

The accumulation processing unit 1060 receives data provided with network control information from the reception processing unit 1030. The accumulation processing unit 1060 acquires data access control information from the control information storage unit 1050 on the basis of the network control information. Assume, for example, that first control information (Network Control Information=SSID1 and Data Access Control Information=Available) and second control information (Network Control Information=SSID2 and Data Access Control Information=Not Available) have been stored in the control information storage unit 1050. When the network control information sent from the reception processing unit 1030 is "SSID1," the accumulation processing unit 1060 searches the control information storage unit 1050 using SSID1 as a key to obtain data access control information ("Available"). When the network control information sent from the reception processing unit 1030 is "SSID2," the accumulation processing unit 1060 searches the control information storage unit 1050 using SSID2 as a key to obtain data access control information ("Not Available"). When the data access control information is "Available," the accumulation processing unit 1060 accumulates a pair of data and control information (network control information and data access control information) in the data storage unit 1080. When the data access control information is "Not Available," the accumulation processing unit 1060 discards the data.

Upon receiving, a control signal indicating that another terminal has been encountered, from the reception processing unit 1030, the forwarding processing unit 1070 determines whether data (forwarding data received from another different terminal or transmission data originated from the terminal 1000) stored in the data storage unit 1080 is to be transmitted to the another terminal. The forwarding processing unit 1070 searches the data storage unit 1080 using network control information provided to a control signal as a key to extract a group of data (in some cases, only one data) having the same network control information from the data storage unit 1080. The forwarding processing unit 1070 further refers to each piece of data access control information of the extracted group of data to extract as "transmittable data," at least one data that can be forwarded or transmitted from the group of data. The forwarding processing unit 1070 provides respective network control information for each transmittable data and transmits the data and the network control information to the transmission processing unit 1040.

Each data is stored in the data storage unit 1080 in association with control information (network control information and data access control information). Hence, when data is recorded in or deleted from the data storage unit 1080, control information is recorded or deleted by interlocking with the data.

The data processing unit 1090 performs processing of utilizing data by the terminal 1000 itself, instead of relay processing (processing of forwarding data to another terminal via the terminal 1000). For example, the data processing unit 1090 reads data from the data storage unit 1080 or writes data into the data storage unit 1080.

In reading data from the data storage unit 1080, the data processing unit 1090, first, refers to data access control information stored in correspondence with data. The data processing unit 1090 can read data having "Data Read Permitted" as data access control information. On the other hand, the data processing unit 1090 does not read data having "Data Read Prohibited" as data access control information.

In writing data into the data storage unit 1080, the data processing unit 1090 determines network control information on the basis of to which data forwarding network the data to be written is sent, and determines data access control information on the basis of how the data is to be handled by the terminal of itself. In this case, before writing data into the data storage unit 1080, the data processing unit 1090 refers to the control information storage unit 1050 to determine whether the control information to be provided to the data and the referred control information are consistent. For example, the data processing unit 1090 determines whether an attempt is made to write data, for a network in which the terminal of itself is not classified as a data utilizing terminal. When the pieces of control information are consistent, the data processing unit 1090 performs data writing. More specifically, the data processing unit 1090 stores data to be written in the data storage unit 1080 in association with control information (network control information and data access control information).

(Operation of Terminal)

Processing performed by the terminal 1000 is roughly classified into first processing that is processing of communication with another terminal, second processing periodically performed for network control, and third processing of utilizing data within the terminal 1000.

Figure 6:
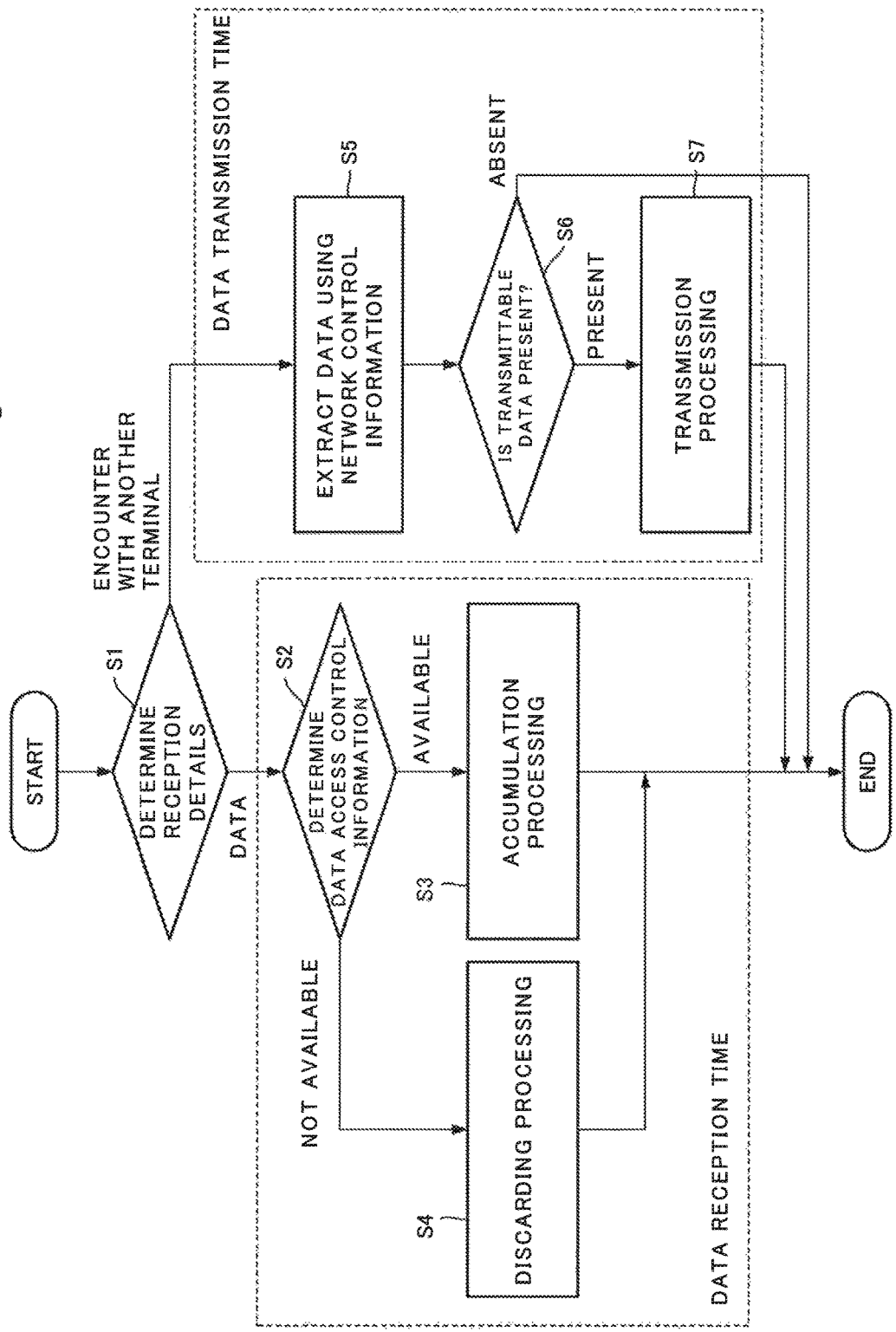
FIG. 6 is a flowchart for explaining the procedure of first processing in the terminal illustrated in FIG. 5.

FIG. 6 is a flowchart for explaining the procedure of first processing in the terminal 1000 illustrated in FIG. 5. The first processing is performed when data transmission/reception to/from another terminal occurs.

Upon receiving data from another terminal, the communication unit 1010 transmits the received data and the network control information of the received data in a pair to the reception processing unit 1030. The reception processing unit 1030 determines whether data sent from another terminal has been received or a control signal related to an encounter with another terminal has been received (step S1).

If data sent from another terminal has been received (if "Data" is determined in step S1), the reception processing unit 1030 passes the received data and the network control information to the accumulation processing unit 1060. The accumulation processing unit 1060 acquires data access control information from the control information storage unit 1050 on the basis of the received network control information.

The accumulation processing unit 1060 determines whether the acquired data access control information is available (step S2).

If the data access control information is available (if "Available" is determined in step S2), the accumulation processing unit 1060 performs accumulation processing (step S3) and ends the processing of the present flow. The accumulation processing means herein, for example, processing of accumulating a pair of data and control information (network control information and data access control information) in the data storage unit 1080.

On the other hand, if the data access control information is not available ("Not Available" is determined in step S2), the accumulation processing unit 1060 discards the data (step S4) and ends the processing of the present flow.

If a control signal upon an encounter with another terminal has been received (if "Encounter with Another Terminal" is determined in step S1), the reception processing unit 1030 passes the control signal and the network control information to the forwarding processing unit 1070.

The forwarding processing unit 1070 searches the data storage unit 1080 using the network control information received from the reception processing unit 1030 as a key, together with the control signal, to extract a group of data having the same network control information from the data storage unit 1080 (step S5). The forwarding processing unit 1070 further refers to each piece of data access control information of the group of data to extract as "transmittable data," data that can be forwarded or transmitted from the group of data. The forwarding processing unit 1070 determines whether transmittable data is present (step S6).

If transmittable data is present (if "Present" is determined in step S6), the forwarding processing unit 1070 performs transmission processing (step S7) and ends the processing of the present flow. The transmission processing means herein processing of transmitting the extracted transmittable data and the control information (network control information and data access control information) in a pair to the transmission processing unit 1040.

If transmittable data is absent (if "Absent" is determined in step S6), the forwarding processing unit 1070 does not perform transmission processing (that is, skips the process in step S7) and ends the processing of the present flow.

Figure 7:
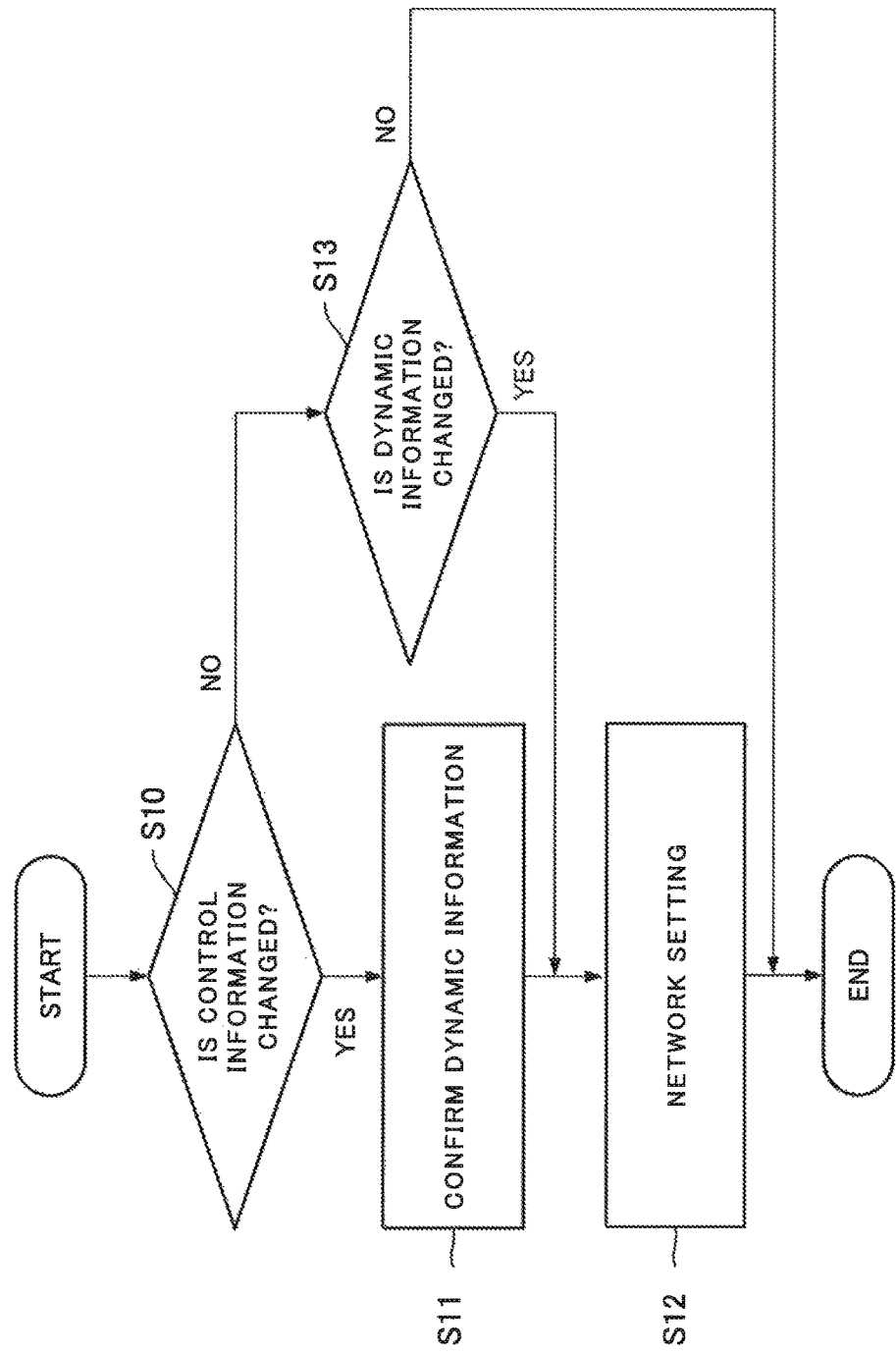
FIG. 7 is a flowchart for explaining the procedure of second processing in the terminal illustrated in FIG. 5.

FIG. 7 is a flowchart for explaining the procedure of second processing in the terminal 1000 illustrated in FIG. 5.

The network control unit 1020 refers to the control information storage unit 1050 to determines whether the control information (network control information and data access control information) recorded in the control information storage unit 1050 has changed (step S10).

If the control information has changed (if "Yes" is determined in step S10), the network control unit 1020 confirms dynamic information associated with network control (step S11). The dynamic information means, for example, a change in state (the position information, the remaining power level, the remaining storage capacity/memory size, or the communication state (communication band, packet loss, delay, or radio field intensity)) of the terminal. When only static control information is utilized without reflecting dynamic information on network control, step S11 is unnecessary.

If the control information has not changed (if "No" is determined in step S10), the network control unit 1020 determines whether the dynamic information associated with network control has changed (step S13).

If the dynamic information has not changed (if "No" is determined in step S13), the network control unit 1020 ends the processing of the present flow.

After the end of the process in step S11, and if the dynamic information has changed (if "Yes" is determined in step S13), the network control unit 1020 performs network setting for the communication unit 1010 on the basis of the static information and dynamic information associated with network control (step S12). The network setting means herein, setting of a new SSID, invalidation of an SSID that has been valid, an increase in the number of reception ports for reception from another terminal by the terminal 1000 (for example, addition of an SSID), a change in SSID (a change in SSID name), a reduction in the number of SSIDs (deletion of a valid SSID) or the like.

Figure 8:
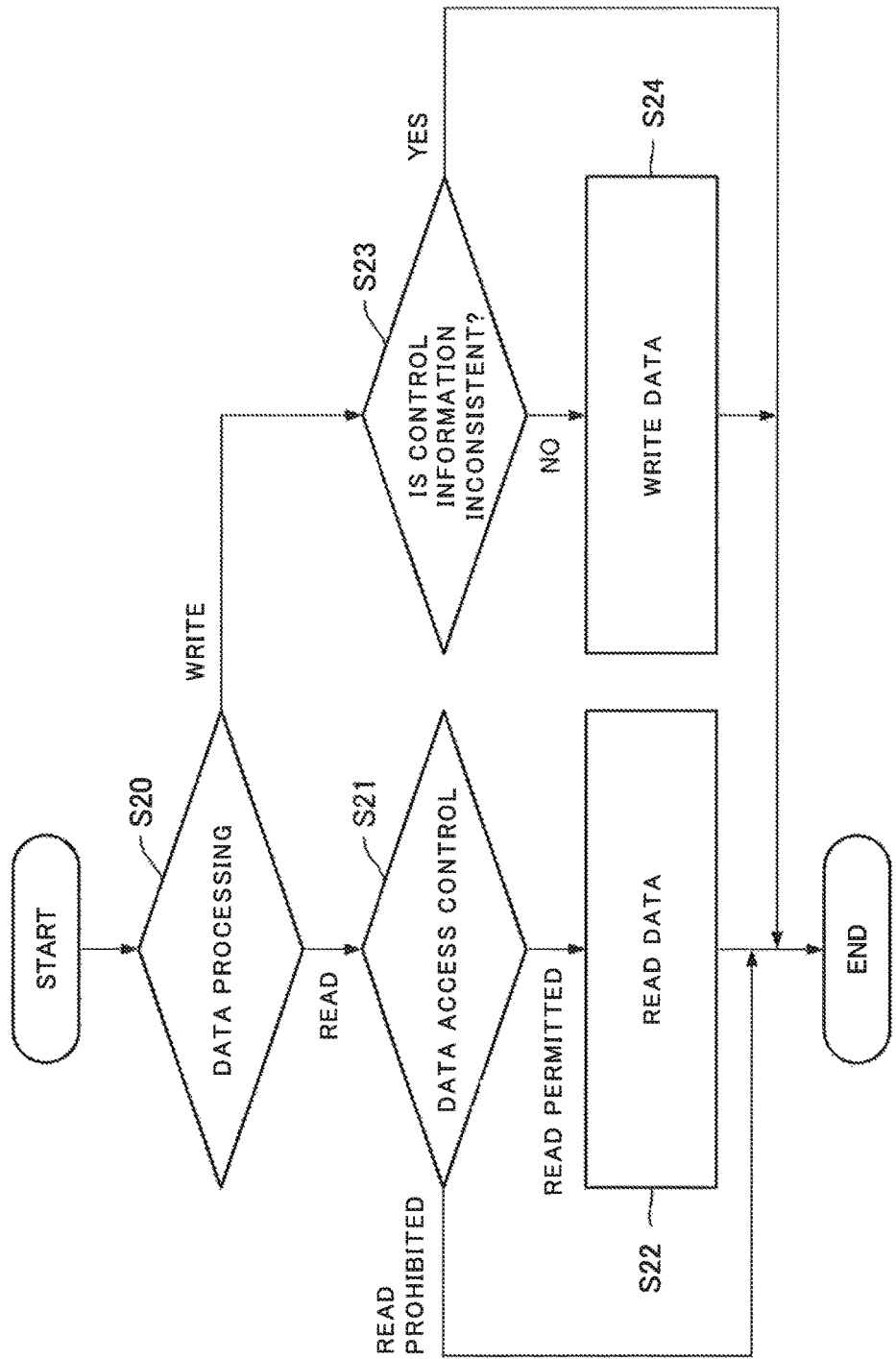
FIG. 8 is a flowchart for explaining the procedure of third processing in the terminal illustrated in FIG. 5.

FIG. 8 is a flowchart for explaining the procedure of third processing in the terminal 1000 illustrated in FIG. 5.

The data processing unit 1090 determines whether the target processing is data read processing or data write processing (step S20).

If the target processing is data read processing (if "Read" is determined in step S20), the data processing unit 1090 refers to data access control information recorded in the data storage unit 1080, together with data, before the data is read from the data storage unit 1080, to determine whether the data access control information is "data is readable" (step S21).

If the data access control information is "data is readable" (if "Readable" is determined in step S21), the data processing unit 1090 reads the target data from the data storage unit 1080 (step S22) and ends the processing of the present flow.

If the data access control information is "data is not readable" (if "Not Readable" is determined in step S21), the data processing unit 1090 does not perform data reading (that is, skips the process in step S22) and ends the processing of the present flow.

If the target processing is data writing (if "Write" is determined in step S20), the data processing unit 1090 refers to the control information storage unit 1050, before data is written into the data storage unit 1080, to determine whether the control information to be provided to the data and the referred control information are consistent (step S23). For example, the data processing unit 1090 determines whether an attempt is made to write data, for a network in which the terminal of itself is not classified as a data utilizing terminal.

If the pieces of control information are consistent (if "No" is determined in step S23), the data processing unit 1090 performs data writing (step S24) and ends the processing of the present flow. In the process in step S24, more specifically, a pair of data and control information (network control information and data access control information) are recorded in the data storage unit 1080.

If the pieces of control information are inconsistent (if "Yes" is determined in step S23), the data processing unit 1090 does not perform data writing (that is, skips the process in step S24) and ends the processing of the present flow.
(Effect)

In the above-described first exemplary embodiment, a terminal that reproduces and forwards data by the store-and-forward system determines terminals that participate in each of a data forwarding network and a data utilizing network by managing two pieces of information concerning network control and data access control simultaneously with data. More specifically, the above-mentioned terminal manages terminals that participate in a data forwarding network using network control information and manages terminals that participate in a data utilizing network using data access control information. In this manner, a network in which a data forwarding network and a data utilizing network are not the same can be established by combining network control information and data access control information.

For example, a wider options for participation become available such as participation in a data forwarding network without participating in a data utilizing network, participation in both networks, or participation in neither network, for each terminal. In particular, "participation in a data forwarding network without participating in a data utilizing network," which has been unavailable in the conventional techniques, can be selected. With this selection, a data forwarding network common among a plurality of data utilizing networks can be established while maintaining the closeness of each data utilizing network.

When network control information and data access control information are added to data, even if the terminal receives data, the operation of the terminal executable on the data is limited by the data access control information. When data reading is prohibited, the terminal may not read data even if the terminal receives the data. This means that the terminal configures a data forwarding network but belongs to no data utilizing network. Network control is used to further determine whether data can be forwarded upon connection. This information allows arbitrary control of a group of terminals configuring a data forwarding network. In this manner, adding two pieces of information concerning network control and data access control obviates the need to always make a data forwarding network and a data utilizing network identical the same.

Figure 9:
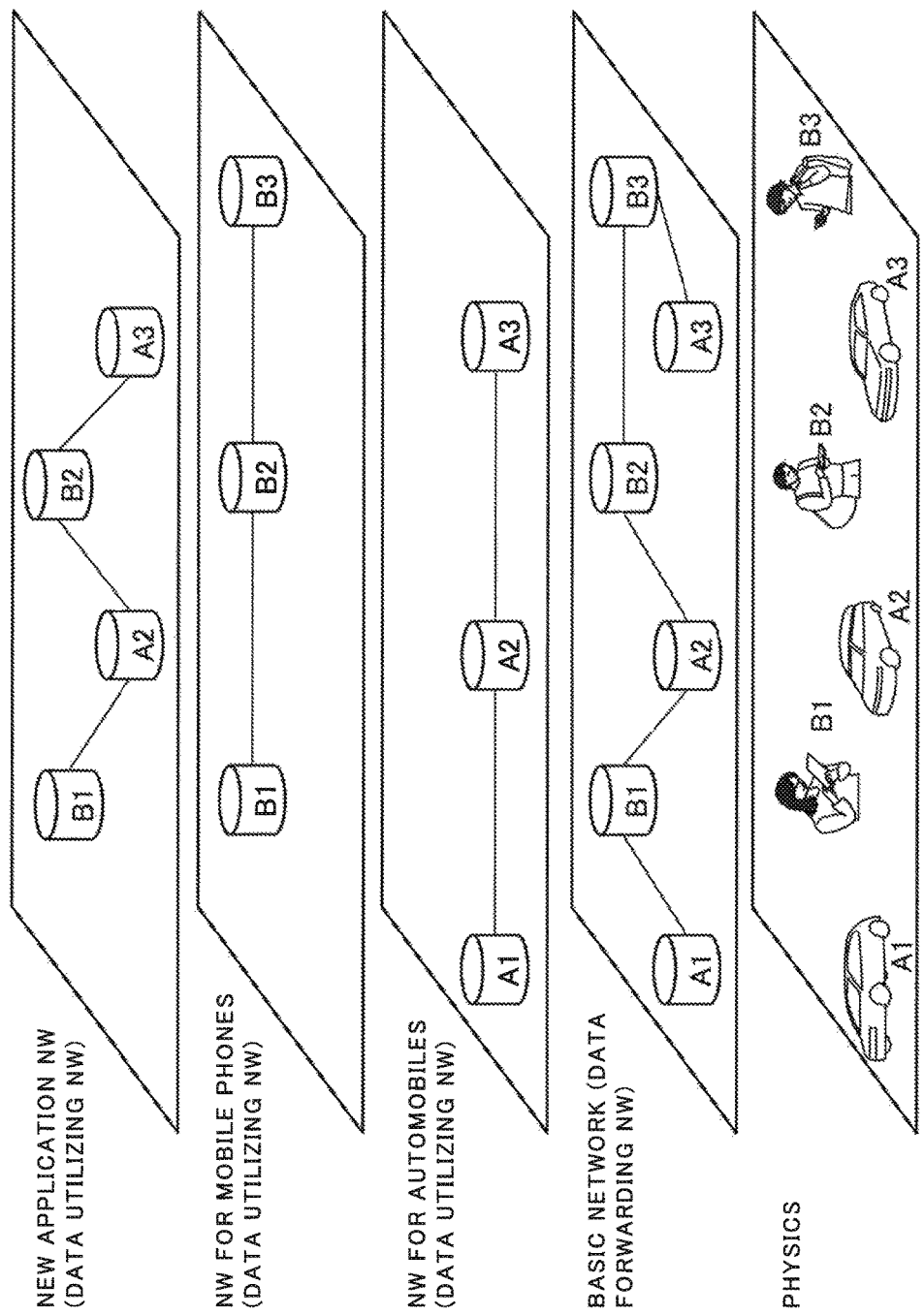
FIG. 9 is a diagram for explaining the effect of the first exemplary embodiment.

When two pieces of information concerning network control and data access control can be managed in combination by each terminal, data forwarding networks and data utilizing networks can be designed as illustrated in FIG. 9. Referring to FIG. 9, six terminals A1, A2, A3, B1, B2, and B3 are present as a physical group of terminals. In this case, the data forwarding network can be formed by all of a maximum of six terminals.

Figure 14:
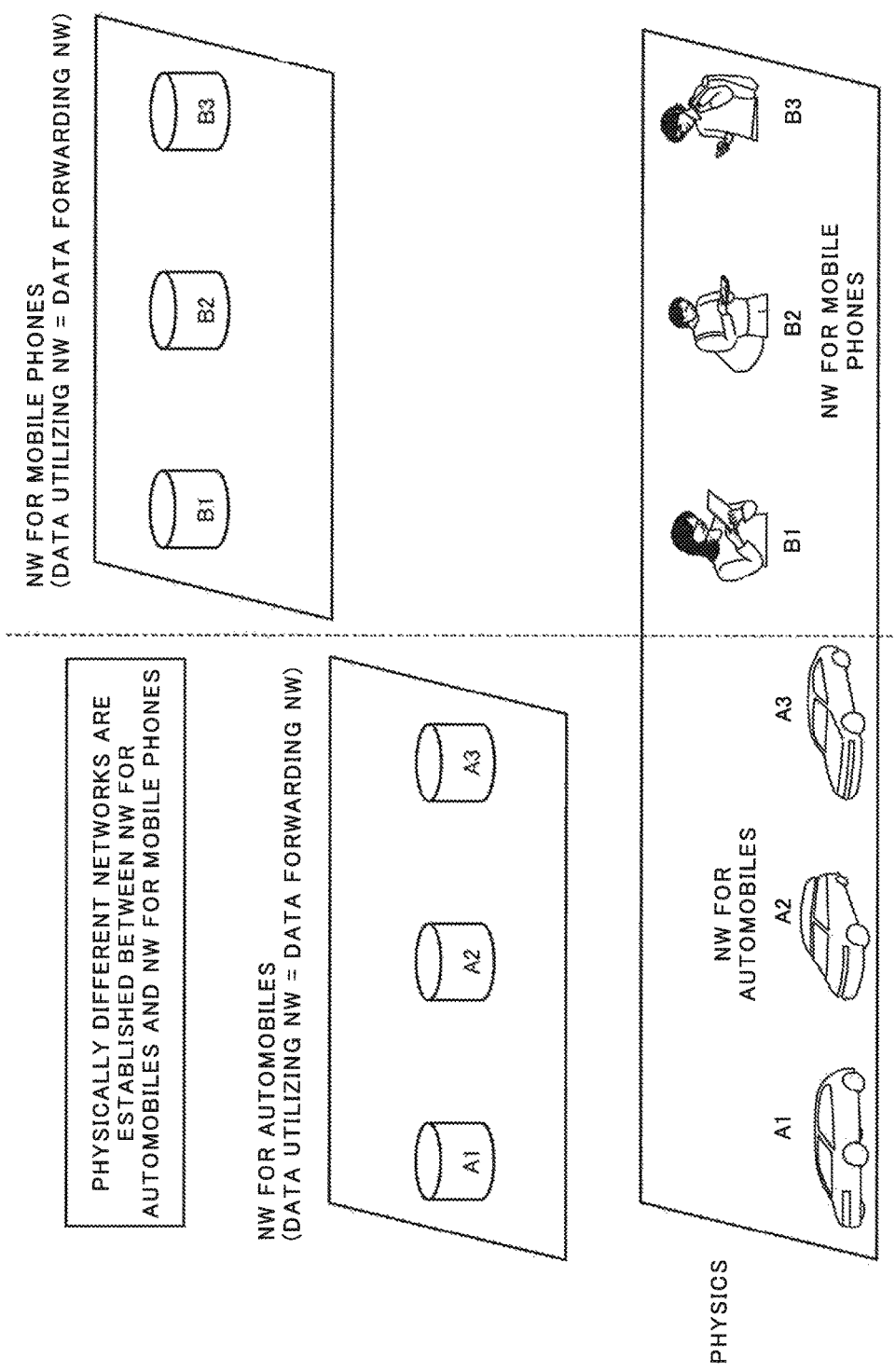
FIG. 14 is a diagram of a general network, for explaining the Background Art.

As can be seen from a comparison between FIG. 14 (Background Art) and FIG. 9 (first exemplary embodiment), the number of components configuring a data utilizing network for automobiles or mobile phones is equal but the number of data forwarding networks in FIG. 9 is twice (3:6) of that in FIG. 14. Therefore, the probability that data will be reached becomes high or the time taken for data to be reached becomes short.

The data utilizing network for automobiles is formed by terminals A1, A2, and A3 and the data utilizing network for mobile phones is formed by terminals B1, B2, and B3. Therefore, the closeness of each data utilizing network is maintained so that, for example, data in the network for automobiles is prevented from spreading to the network for mobile phones.

In addition, according to the present exemplary embodiment, since the data utilizing networks are freed from physical constraints, a data utilizing network for a newly defined application can be freely extracted from six terminals and formed (in the example illustrated in FIG. 9, the network is formed by four terminals A2, A3, B1, and B2).

Upon summing up the foregoing description, the first exemplary embodiment can achieve both prevention of data spread across different data utilizing networks and an increase in the number of terminals configuring a data forwarding network.

With an increase in the number of terminals participating in a data forwarding network, it is possible to avoid the risks of prolonging the time taken for data to arrive at a target reception terminal, or hindering data from arriving at a target reception terminal in the worst case.
(Modification)

Although the first exemplary embodiment exemplifies the use of DTN as a communication protocol, the present invention is not limited to this. Accordingly, the terminals may be either movable or stationary, the communication configuration may be either wired or wireless, and the protocol used may be either DTN or a unique protocol.

The present exemplary embodiment exemplifies the use of the SSID (BSSID or ESSID) of a wireless LAN for network control for identifying whether data forwarding networks are identical. However, the present invention is not limited to the SSID as long as information that can distinguish networks is used, and other types of information may be used. In, for example, ZigBee (registered trademark), PAN (Personal Area Networking Profile) identifiers are used. In the wired configuration, the port numbers of switches may be used for distinction. Note that with network control, each terminal is connected only to the network IDs described herein.

The present exemplary embodiment further exemplifies referring to static control information (SSID) held by the terminal in advance, as network control for identifying whether data forwarding networks are identical. However, the control information may be dynamically changed in accordance with the conditions of the terminal. For example, it is possible to establish connection to a network only at a specific location (the condition is the terminal position). More specifically, when a plurality of locations A, B, C, and D are present, the information indicating that locations A and C belong to network 1 and locations C and D belong to network 2 is recorded in the network control information. In this case, a data forwarding network is determined not for each terminal but for each location. Then, each terminal can be connected to a network only at the locations described herein. Other methods may include a method for establishing connection to a network only when the remaining power level of the terminal is equal to or higher than a predetermined value (the condition is the remaining power level of the terminal), a method for establishing connection to a network only when the memory size is equal to or higher than a predetermined value (the condition is the memory size or remaining storage capacity of the terminal), and a method for determining connection to a network in accordance with the communication states such as the communication bandwidth, packet loss rate, network delay, and radio field intensity.

Furthermore, as exemplary network control, these conditions may be combined into a condition in which each terminal refers to the network ID, location information, and remaining storage capacity to permit connection when a terminal having a designated network ID located at a location where the terminal of itself is permitted to be connected is present, and the memory size of the terminal of itself is equal to or higher than a predetermined value.

The present exemplary embodiment further exemplifies referring to static control information held by the terminal in advance, as data access control for identifying whether data utilizing networks are identical. However, the control information may be dynamically changed in accordance with the conditions of the terminal. For example, it is possible to permit data reading or data writing only at a specific location (the condition is the terminal position). With this constraint, since information can be read or written only when one goes to a specific location, the terminal can be guided to the specific location. Control may also be done to permit only data forwarding at a specific location and permit data reading or writing at another location. Other methods may include, for the actions of data access control, adding the remaining power level of the terminal to a condition, adding the memory size or remaining storage capacity to a condition, and adding the communication states such as the communication bandwidth, packet loss rate, network delay, and radio field intensity to conditions.

As described above, network control and data access control are represented by actions and conditions. The actions of network control may include an instruction indicating whether connection is to be established, and the actions of data access control may include instructions indicating "Data Reading Permitted," "Data Writing Permitted," "Data Forwarding Permitted," "Data Reception Permitted," "Data Transmission Permitted," and a combination of these instructions. The conditions of network control and data access control may include the position information, the remaining power level, the remaining storage capacity/memory size, and the communication states (communication band, packet loss, delay, and radio field intensity), and an operation can be determined by a combination thereof.

Second Exemplary Embodiment

The feature of a second exemplary embodiment of the present invention lies in that a data forwarding network and a data utilizing network are controlled by adding control information (network control information and data access control information) to forwarding data itself, unlike in the first exemplary embodiment.

(Network Configuration)

Figure 10:
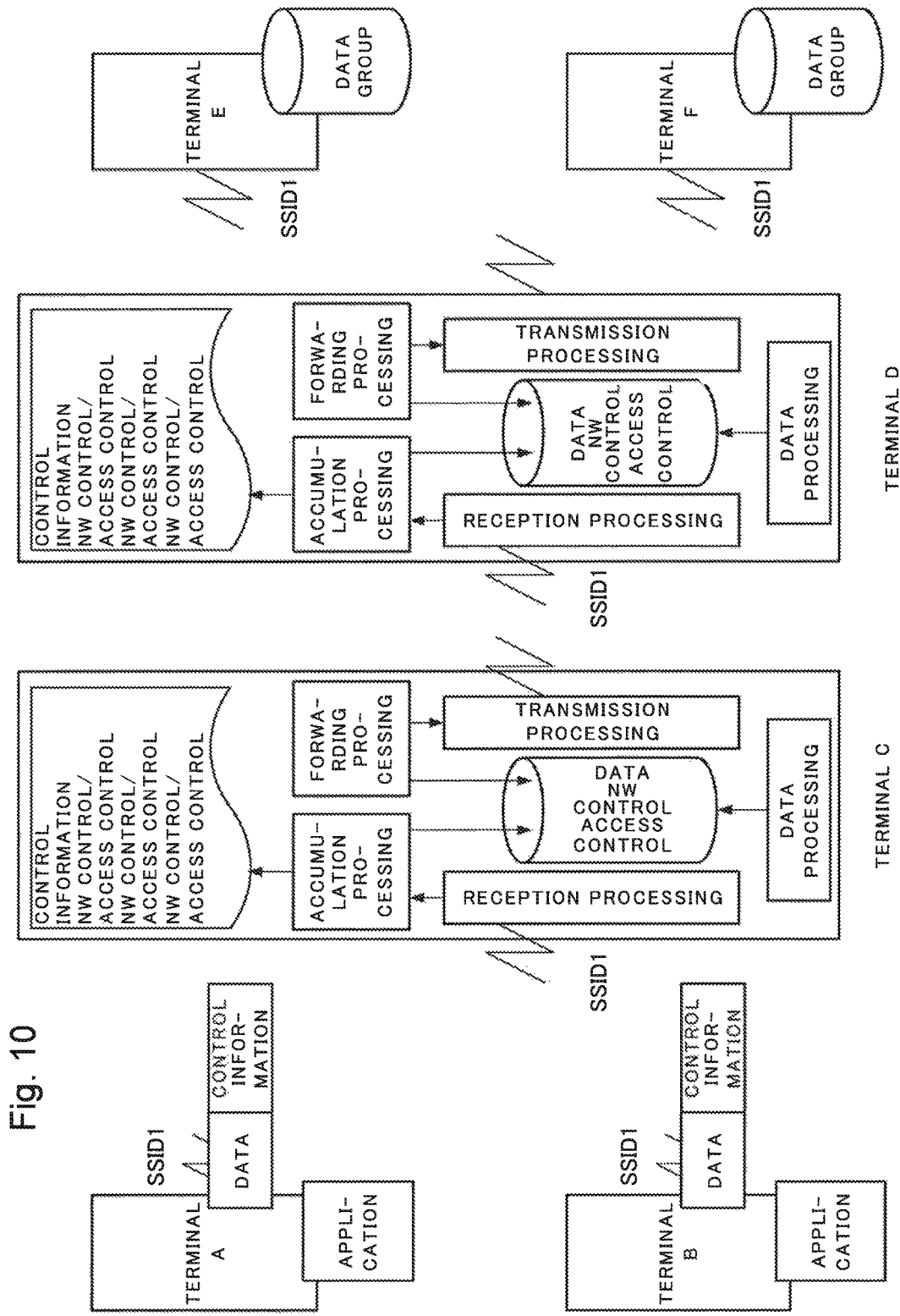
FIG. 10 is a diagram illustrating an exemplary network configuration according to a second exemplary embodiment of the present invention.

FIG. 10 is a diagram illustrating an exemplary network configuration in the second exemplary embodiment. This network includes six terminals (terminals A to F). Although FIG. 10 illustrates the internal configuration of each of terminals C and D, the internal configurations of all terminals A to F are the same. Therefore, like terminals C and D, the terminals other than terminals C and D perform data reception processing, data transmission processing, and data accumulation processing.

As described in the beginning of the second exemplary embodiment, the feature of the second exemplary embodiment lies in that control information (network control information and data access control information) is added to forwarding data itself. Accordingly, FIG. 10 (second exemplary embodiment) is different from FIG. 1 (first exemplary embodiment) in that the structure of forwarding data is different and internal components constituting the terminals are added or changed in relation thereto.

(Configuration of Terminal)

Figure 11:
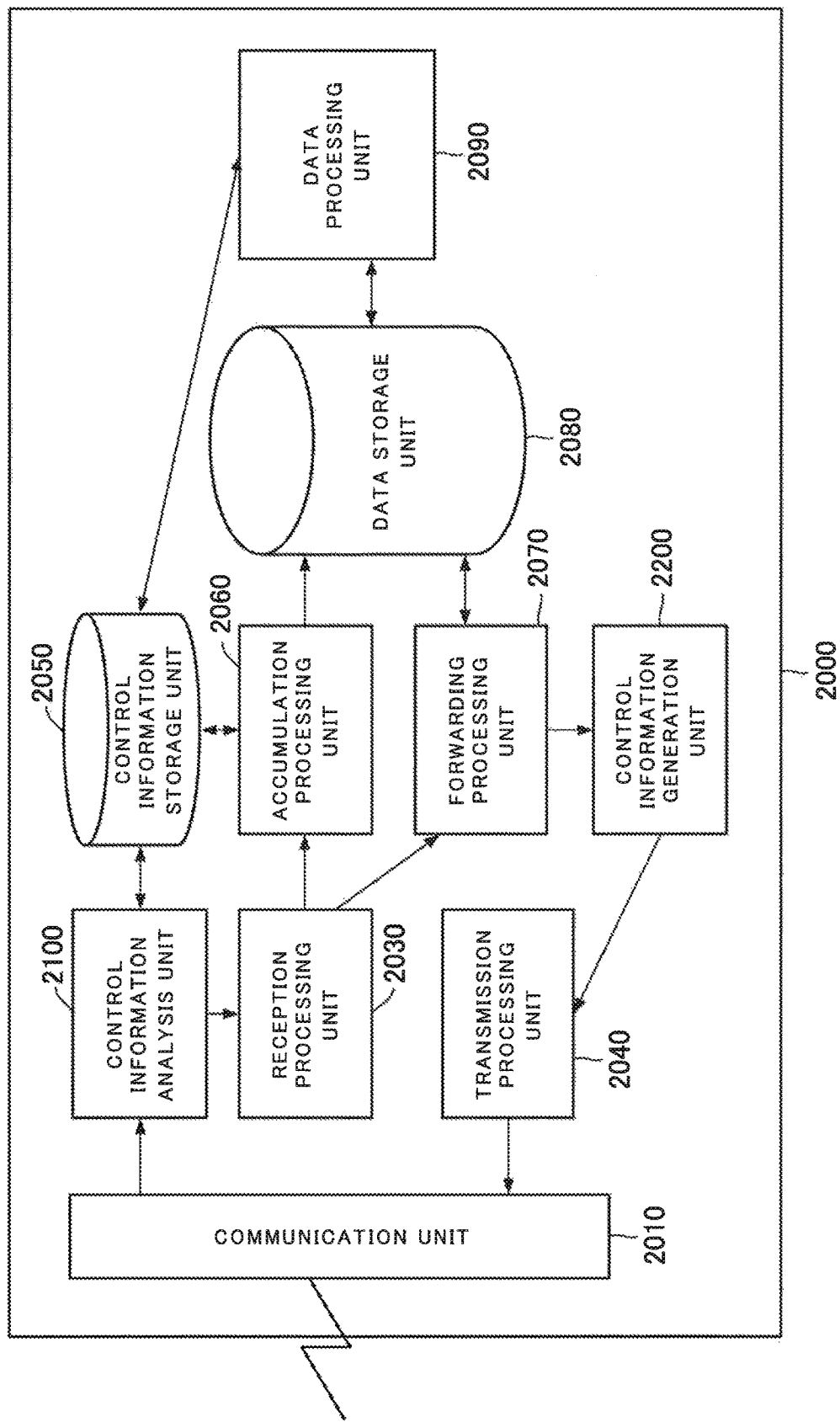
FIG. 11 is a block diagram illustrating an exemplary configuration of a terminal according to the second exemplary embodiment.

FIG. 11 is a block diagram illustrating an exemplary configuration of a terminal 2000 according to the second exemplary embodiment of the present invention.

The terminal 2000 includes a communication unit 2010, a control information analysis unit 2100, a reception processing unit 2030, a transmission processing unit 2040, a control information storage unit 2050, an accumulation processing unit 2060, a forwarding processing unit 2070, a control information generation unit 2200, a data storage unit 2080, and a data processing unit 2090.

The communication unit 2010 exchanges data with another terminal via a wireless or wired communication network. Upon receiving data, the communication unit 2010 transmits data received from another terminal and control information (network control information and data access control information) to the control information analysis unit 2100. In transmitting data, the communication unit 2010 transmits data sent from the transmission processing unit 2040 and control information to another terminal.

The control information analysis unit 2100 receives data and control information from the communication unit 2010 and analyzes the control information. If network control information for the received data is absent in the control information storage unit 2050, the control information analysis unit 2100 discards the data. On the other hand, if network control information for the received data is present in the control information storage unit 2050, the control information analysis unit 2100 transmits the data and the control information to the reception processing unit 2030.

The reception processing unit 2030 performs reception processing of data received by the control information analysis unit 2100. The reception processing itself in the reception processing unit 2030 is the same as that in the reception processing unit 1030 of the first exemplary embodiment (see FIG. 5). Therefore, this processing will not be described in detail herein. In data reception, the reception processing unit 2030 passes data and network control information to the accumulation processing unit 2060. On the other hand, for a control signal indicating that another terminal has been encountered, the reception processing unit 2030 passes data and network control information to the forwarding processing unit 2070.

The transmission processing unit 2040 performs transmission processing of "transmittable data" transmitted from the control information generation unit 2200. Since the transmission processing itself in the transmission processing unit 2040 is the same as that in the transmission processing unit 1040 illustrated in FIG. 5, a detailed description thereof will not be given herein. In transmitting data, the transmission processing unit 2040 transmits data and control information to the communication unit 2010.

The control information storage unit 2050 stores at least one piece of control information. Each piece of control information includes network control information and data access control information. Examples of the network control information may include a network identifier. In the present exemplary embodiment, the network identifier is added to data as control information. The network identifier is not limited to a physical network identifier such as the port number of a wired switch or the SSID of a wireless LAN, and the logical value may be set. Examples of the data access control information may include each of data read permission/prohibition information, data write permission/prohibition information, data forwarding permission/prohibition information, data reception permission/prohibition information, data transmission permission/prohibition information, or a combination of these pieces of permission/prohibition information. As a specific example, all accesses (data reading, data writing, data forwarding, data reception, and data transmission) are permitted for network identifier 1, partial accesses (data forwarding, data reception, and data transmission) are permitted for network identifier 2, partial accesses (only data transmission) are permitted for network identifier 3, and the like.

The accumulation processing unit 2060 receives data and network control information from the reception processing unit 2030. The accumulation processing unit 2060 acquires data access control information from the control information storage unit 2050 on the basis of the network control information. Assume, for example, that first control information (Network Control Information=Network Identifier 1 and Data Access Control Information=Available) and second control information (Network Control Information=Network Identifier 2 and Data Access Control Information=Not Available) have been stored in the control information storage unit 2050. When the network control information sent from the reception processing unit 2030 is "Network Identifier 1," the accumulation processing unit 2060 inquires of the control information storage unit 2050 to obtain data access control information ("Available"). When the network control information sent from the reception processing unit 2030 is "Network Identifier 2," the accumulation processing unit 2060 inquires of the control information storage unit 2050 to obtain data access control information ("Not Available"). The accumulation processing unit 2060 accumulates a pair of data and control information (network control information and data access control information) in the data storage unit 1080. When the data access control information is "Not Available," the accumulation processing unit 2060 discards the data.

Upon receiving a control signal indicating that another terminal has been encountered from the reception processing unit 2030, the forwarding processing unit 2070 determines whether data (forwarding data received from another different terminal or transmission data originated from the terminal 2000) stored in the data storage unit 2080 is to be transmitted to the another terminal. The forwarding processing unit 2070 refers to the data storage unit 2080 on the basis of the network control information received from the reception processing unit 2030, together with the control signal, to extract a group of data (in some cases, only one data) having the same network control information from the data storage unit 2080. The forwarding processing unit 2070 further refers to each piece of data access control information of the extracted group of data to extract as "transmittable data," at least one data that can be forwarded or transmitted from the group of data. The forwarding processing unit 2070 transmits the extracted transmittable data to the control information generation unit 2200, together with the control information.

The control information generation unit 2200 converts the transmittable data received from the forwarding control unit 2070 into a data format for sending from one terminal to another terminal (for example, adds control information to each transmittable data as header information). The control information generation unit 2200 transmits each converted transmittable data to the transmission processing unit 2040.

The data storage unit 2080 and the data processing unit 2090 are equivalent to the data storage unit 1080 and the data processing unit 1090 (see FIG. 5 for details of both units), respectively, of the first exemplary embodiment. Therefore, these units will not be described herein.

(Operation of Terminal)

Processing performed by the terminal 2000 is roughly classified into fourth processing that is processing of communication with another terminal and fifth processing of utilizing data within the terminal 2000. Since the fifth processing is the same as the third processing of the first exemplary embodiment, a description thereof will not be given herein.

Figure 12:
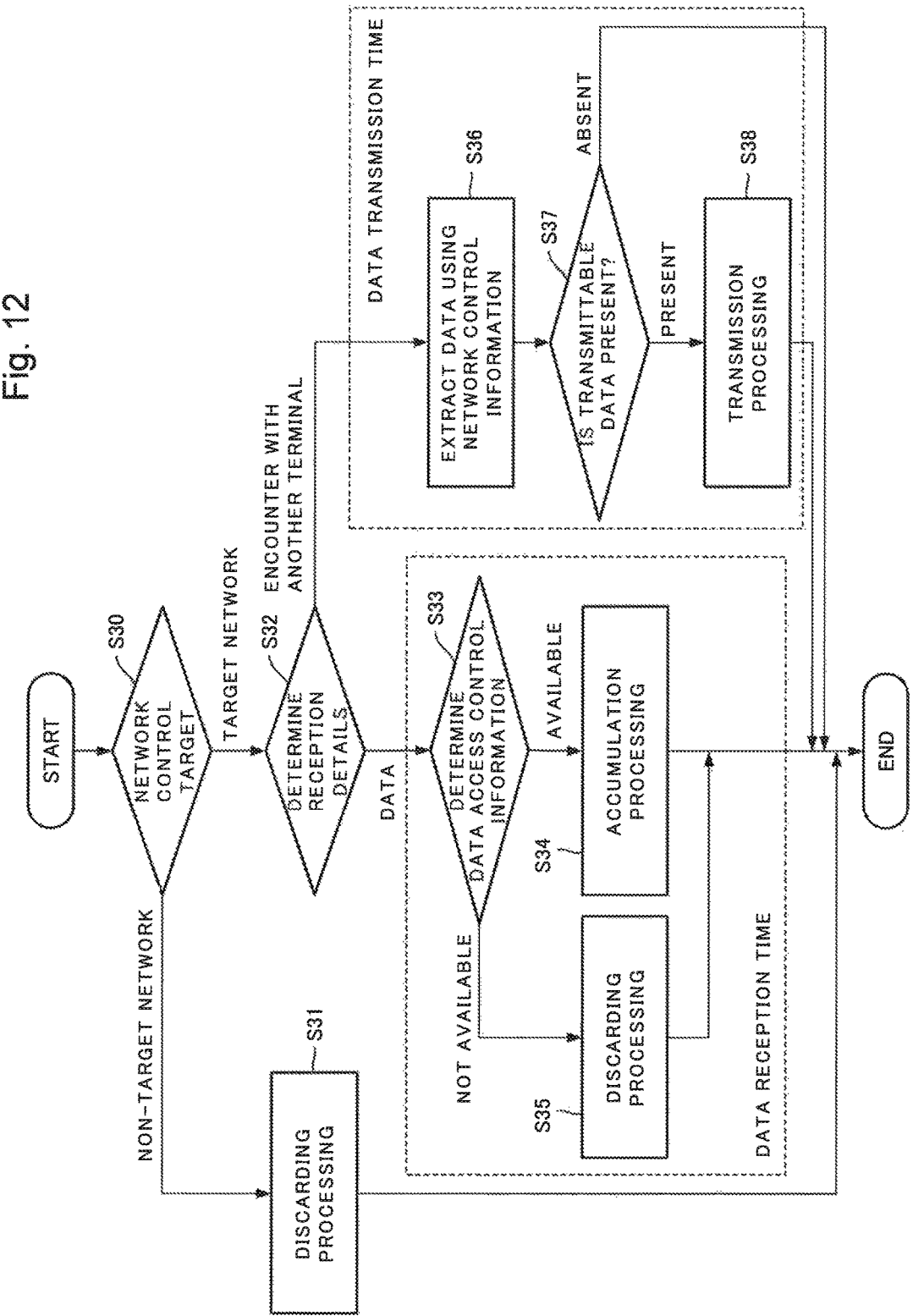
FIG. 12 is a flowchart for explaining the procedure of fourth processing in the terminal illustrated in FIG. 11.

FIG. 12 is a flowchart for explaining the procedure of fourth processing in the terminal 2000 illustrated in FIG. 11. The fourth processing is performed when data transmission or reception to or from another terminal occurs.

Upon communicating with another terminal, the control information analysis unit 2100 receives data and control information from the communication unit 2010. The control information analysis unit 2100 confirms whether network control information for the received data is present in the control information storage unit 2050 to determine whether the received data is the target for network control (step S30).

If the received data is not the target for network control (if "Non-target Network" is determined in step S30), the control information analysis unit 2100 discards the data (step S31) and ends the processing of the present flow.

If the received data is the target for network control (if "Target Network" is determined in step S30), the control information analysis unit 2100 passes the received data to the reception processing unit 2030.

The reception processing unit 2030 determines whether data sent from another terminal has been received or a control signal related to an encounter with another terminal has been received (step S32).

If data sent from another terminal has been received (if "Data" is determined in step S32), the reception processing unit 2030 passes the received data and the network control information to the accumulation processing unit 2060. The accumulation processing unit 2060 acquires data access control information from the control information storage unit 2050 on the basis of the received network control information. The accumulation processing unit 2060 determines whether the acquired data access control information is available (step S33).

If the data access control information is available ("Available" is determined in step S33), the accumulation processing unit 2060 performs accumulation processing (step S34) and ends the processing of the present flow. The accumulation processing means herein, for example, processing of accumulating a pair of data and control information (network control information and data access control information) in the data storage unit 2080.

If the data access control information is not available (if "Not Available" is determined in step S33), the accumulation processing unit 2060 discards the data (step S35) and ends the processing of the present flow.

If a control signal upon an encounter with another terminal has been received (if "Encounter with Another Terminal" is determined in step S32), the reception processing unit 2030 passes the control signal and the network control information to the forwarding processing unit 2070.

The forwarding processing unit 2070 refers to the data storage unit 2080 on the basis of the network control information received from the reception processing unit 2030, together with the control signal, to extract a group of data having the same network control information from the data storage unit 2080 (step S36). The forwarding processing unit 2070 further refers to each piece of data access control information of the group of data to extract as "transmittable data," data that can be forwarded or transmitted from the group of data. The forwarding processing unit 2070 determines whether transmittable data is present (step S37).

If transmittable data is present (if "Present" is determined in step S37), the forwarding processing unit 2070 performs transmission processing (step S38) and ends the processing of the present flow. The above-mentioned transmission processing will be described below. The forwarding processing unit 2070 passes a pair of transmittable data and control information to the control information generation unit 2200. The control information generation unit 2200 converts the transmittable data into a data format for sending the data to another terminal and sends the converted transmittable data to the transmission processing unit 2040. The transmission processing unit 2040 transmits the transmittable data to another terminal via the communication unit 2010.

If transmittable data is absent (if "Absent" is determined in step S37), the forwarding processing unit 2070 does not perform transmission processing (that is, skips the processing in step S38) and ends the processing of the present flow. (Effect)

In the above-described second exemplary embodiment, data sent from one terminal to another terminal includes control information, unlike in the first exemplary embodiment. This information also includes network control information. Therefore, the reception ports of networks and the identifiers of the networks does not need to be associated. Even if a network includes only one reception port, since the control information represents network control information (network identifier), a plurality of data forwarding networks can be used for belonging.

In addition, even the second exemplary embodiment is the same as the first exemplary embodiment in terms of control within the terminal (determining terminals that participate in each of a data forwarding network and a data utilizing network by managing two pieces of information concerning network control and data access control simultaneously with data). Thus, the second exemplary embodiment can achieve the same effect as that in the first exemplary embodiment. (Modification)

In data access control of control information included in data sent from one terminal to another terminal in the second exemplary embodiment, dynamic conditions can be added. Examples of the dynamic conditions include permission of data reading or data writing only at a specific location. With this constraint, since information can be read or written only when one goes to a specific location, the terminal can be guided to the specific location. Control may also be done to permit only data forwarding at a specific location and permit data reading or writing at another location. Other methods may include, for the actions of data access control, adding the remaining power level of the terminal to a condition, adding the memory size or remaining storage capacity to a condition, and adding the communication states such as the communication bandwidth, packet loss rate, network delay, and radio field intensity to conditions. In this case, the dynamic conditions of control information added to data received from the outside of the terminal and static control information stored within the terminal may be combined to perform reception determination by the control information analysis unit 2100 or processing of recording in the data storage unit 2080 by the accumulation processing unit 2060.

Third Exemplary Embodiment

Figure 13:
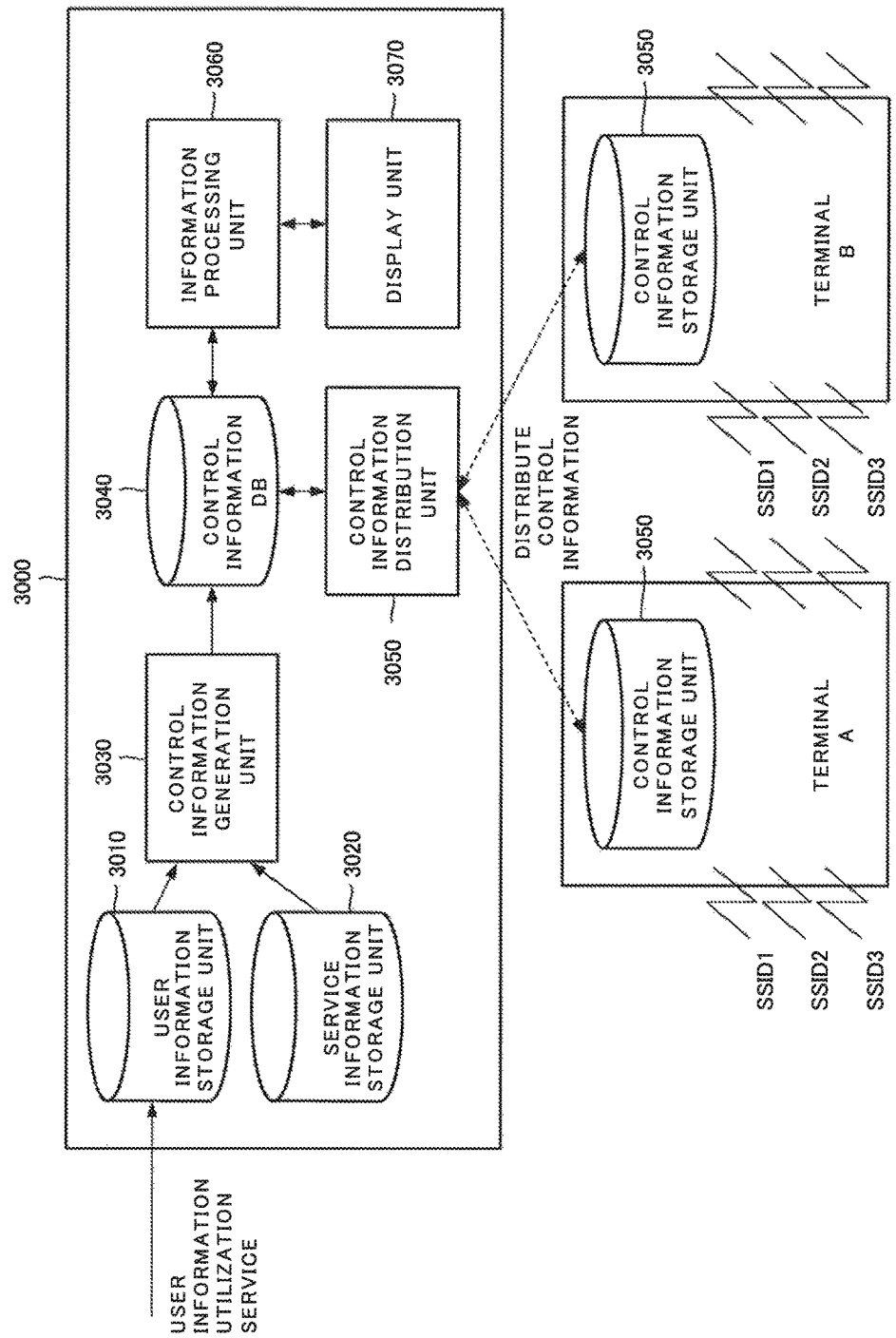
FIG. 13 is a block diagram illustrating an exemplary configuration of a control information distribution server according to a third exemplary embodiment of the present invention.

FIG. 13 is a block diagram illustrating an exemplary configuration of a control information distribution server 3000 according to a third exemplary embodiment of the present invention.

The control information distribution server 3000 serves to distribute the control information in the first or second exemplary embodiment. Since the terminal used in the third exemplary embodiment is equivalent to the terminal 1000 according to the first exemplary embodiment or the terminal 2000 according to the second exemplary embodiment, a description thereof will not be given.

The control information distribution server 3000 includes a user information storage unit 3010, a service information storage unit 3020, a control information generation unit 3030, a control information DB 3040, a control information distribution unit 3050, an information processing unit 3060, and a display unit 3070.

The user information storage unit 3010 receives a request of service to be utilized from the user and records this information. In the recorded information, the user name and the service name are paired as one record. The user can utilize a plurality of services. As the services, two levels are defined: the case where an application is utilized and the case where data is forwarded without utilizing an application. As a form, the user may be prohibited from selecting an application when data is forwarded without utilizing an application, and a plurality of services may be automatically selected upon selection of an application by setting of the information distribution server 3000. Examples may include herein the case where when the user selects the service of a network for automobiles, he or she can utilize the data of the network for automobiles, and although is not allowed to utilize the data of a network for mobile phones, he or she carries the data.

The service information storage unit 3020 serves as a database which associates applications with network identifiers.

The control information generation unit 3030 generates user-specific control information (network control information and data access control information) on the basis of the data (user name, service name, and utilization level) of the user information storage unit 3010 and the data (service name and network identifier) of the service information storage unit 3020. The control information generation unit 3030 records in the control information DB 3040, control information defining the network identifier as network control information and the utilization level as data access control information.

The control information DB 3040 is information including the user name, the network control information, and the data access control information in a set. As the network control information, a network identifier such as the SSID, the port number, or the logical number is recorded. As the data access control information, a data utilization level such as each of data read permission/prohibition information, data write permission/prohibition information, data forwarding permission/prohibition information, data reception permission/prohibition information, and data transmission permission/prohibition information, or a combination of these pieces of permission/prohibition information is recorded.

The control information distribution unit 3050 reads control information from the control information DB 3040 and distributes the read control information to terminal A or B when the control information distribution server 3000 becomes able to communicate with terminal A or B via a network. When, for example, terminal A communicates with the control information distribution server 3000 via a network, the control information distribution unit 3050 inquires of terminal A about the user name. When terminal A sends back the user name, the control information distribution unit 3050 refers to the control information DB 3040 on the basis of the user name. When the user having undergone reception is present in the control information DB 3040, the control information distribution unit 3050 obtains control information concerning the user name from the control information DB 3040 and transmits it to terminal A having made an inquiry.

The information processing unit 3060 processes the information of the control information DB 3040 for release the information to the network administrator or the user. As an example, when a particular service is associated with location information (data can be utilized only at a specific location or data communication is performed only at a specific location), map information is associated with service information.

The display unit 3070 displays the information processed by the information processing unit 3060. When data can be utilized only at a specific location or data communication is enabled only at a specific location, a service area is graphically illustrated on map information.

A program for implementing all or some of the functions according to the above-described exemplary embodiments may be recorded on a computer-readable recording medium and executed by a computer system.

Examples of the "computer system" may include a CPU (Central Processing Unit).

The "computer-readable recording medium" serves as, for example, a non-transitory storage device. Examples of the non-transitory storage device may include portable media such as a magnetooptical disk, a ROM (Read Only Memory), and a non-volatile semiconductor memory, and a hard disk built into the computer system. The "computer-readable recording medium" may serve as a transitory storage device. Examples of the transitory storage device may include communication wires when programs are transmitted via networks such as the Internet or communication lines such as telephone lines, or a volatile memory within the computer system.

The above-described program may serve to implement some of the above-described functions, or may even be implemented by combining the above-described functions with a program already recorded in the computer system.

Part or all of the above-described exemplary embodiments may be described as in the following supplementary notes, but they are not limited thereto.

<Supplementary Note 1>

A terminal device that reproduces and forwards data by a store-and-forward system, wherein the device determines participation in each of a data forwarding network and a data utilizing network by managing network control information for network control and data access control information for data access control simultaneously with data.

<Supplementary Note 2>

The terminal device according to supplementary note 1, comprising:

control information storage means for storing the network control information and the data access control information in a pair in advance;

data storage means for storing data, and the network control information and the data access control information in association with each other;

communication means for adding the network control information to data received from another terminal and outputting the network control information and the data;

accumulation means for determining whether the data is to be accumulated on the basis of the network control information recorded in the control information storage means and the network control information output from the communication means;

forwarding means for obtaining from the control information storage means, the data access control information corresponding to the network control information received from the communication means, and extracting data of a network to which the another terminal belongs from the data storage means on the basis of the obtained data access control information;

transmission means for transmitting the data extracted by the forwarding means to the another terminal;

data processing means for, in reading read data from the data storage means, reading the read data on the basis of the data access control information, and in writing write data into the data storage means, providing the write data with any pair of the network control information and the data access control information stored in the control information storage means; and network control means for changing setting of the communication means on the basis of the network control information.

<Supplementary Note 3>

The terminal device according to supplementary note 1, comprising:

control information storage means for storing the network control information and the data access control information in a pair in advance;

data storage means for storing data, and the network control information and the data access control information in association with each other;

communication means for receiving from another terminal, reception data provided with the network control information and the data access control information;

control information analysis means for comparing the network control information received from the communication means with the network control information stored in the control information storage means and determining whether the reception data is to be output in accordance with a comparison result;

accumulation means for determining whether the reception data is to be accumulated on the basis of the network control information recorded in the control information storage means and the network control information output from the control information analysis means;

forwarding means for obtaining, from the control information storage means, the data access control information corresponding to the network control information received from the control information analysis means, and extracting data of a network to which the another terminal belongs from the data storage means on the basis of the obtained data access control information;

control information generation means for adding the network control information and the data access control information to the data extracted by the forwarding means to generate a format of transmission data;

transmission means for transmitting the transmission data generated by the control information generation means to the another terminal; and data processing means for, in reading read data from the data storage means, reading the read data on the basis of the data access control information, and in writing write data into the data storage means, providing the write data with any pair of the network control information and the data access control information stored in the control information storage means.

\<Supplementary Note 4\>

The terminal device according to any one of supplementary notes 1 to 3, wherein the network control information is determined from any of a network identifier, an SSID of a wireless LAN, a ZigBee PAN identifier, port numbers of a router and a switch, a terminal position, a remaining power level, a remaining storage capacity, a memory size, and a communication state, or a combination thereof.

\<Supplementary Note 5\>

The terminal device according to any one of supplementary notes 1 to 4, wherein the data access control information is determined from any of data read authority, data write authority, data forwarding authority, data reception authority, data transmission authority, a terminal position, a remaining power level, a remaining storage capacity, a memory size, and a communication state, or a combination the pieces of the information.

\<Supplementary Note 6\>

A communication system comprising:

the terminal device according to any one of supplementary notes 1 to 5; and a control information distribution server comprising: control information generation means for generating the network control information and the data access control information on the basis of user information and service information; control information storage means for storing the generated network control information and the data access control information; and control information distribution means for reading and distributing the network control information and the data access control information stored in the control information storage means to the terminal device.

\<Supplementary Note 7\>

The communication system according to supplementary note 6, wherein the control information distribution server further comprises display means for displaying predetermined information obtained by processing the generated network control information and the data access control information.

\<Supplementary Note 8\>

A control method for controlling a terminal device that reproduces and forwards data by a store-and-forward system, the method comprising:

determining participation in each of a data forwarding network and a data utilizing network by managing network control information for network control and data access control information for data access control simultaneously with data.

\<Supplementary Note 9\>

The control method according to supplementary note 8, further comprising:

storing the network control information and the data access control information in a pair in advance;

storing data, and the network control information and the data access control information in association with each other;

adding the network control information to data received from another terminal and outputting the network control information and the data;

determining whether the data is to be accumulated on the basis of the network control information recorded in the control information storage means and the network control information output from the communication means;

obtaining from the control information storage means, the data access control information corresponding to the network control information received from the communication means, and extracting data of a network to which the another terminal belongs from the data storage means on the basis of the obtained data access control information;

transmitting the data extracted by the forwarding means to the another terminal;

in reading read data from the data storage means, reading the read data on the basis of the data access control information, and in writing write data into the data storage means, providing the write data with any pair of the network control information and the data access control information stored in the control information storage means; and changing setting of the communication means on the basis of the network control information.

\<Supplementary Note 10\>

The control method according to supplementary note 8, further comprising:

storing the network control information and the data access control information in a pair in advance;

storing data, and the network control information and the data access control information in association with each other;

receiving, from another terminal, reception data provided with the network control information and the data access control information;

comparing the network control information received from the communication means with the network control information stored in the control information storage means and determining whether the reception data is to be output in accordance with a comparison result;

determining whether the reception data is to be accumulated on the basis of the network control information recorded in the control information storage means and the network control information output from the control information analysis means;

obtaining, from the control information storage means, the data access control information corresponding to the network control information received from the control information analysis means, and extracting data of a network to which the another terminal belongs from the data storage means on the basis of the obtained data access control information;

adding the network control information and the data access control information to the data extracted by the forwarding means to generate a format of transmission data;

transmitting the transmission data generated by the control information generation means to the another terminal; and in reading read data from the data storage means, reading the read data on the basis of the data access control information, and in writing write data into the data storage means, providing the write data with any pair of the network control information and the data access control information stored in the control information storage means.

\<Supplementary Note 11\>

The control method according to any one of supplementary notes 8 to 10, wherein the network control information is determined from any of a network identifier, an SSID of a wireless LAN, a ZigBee PAN identifier, port numbers of a router and a switch, a terminal position, a remaining power level, a remaining storage capacity, a memory size, and a communication state, or a combination of pieces of information thereof.

\<Supplementary Note 12\>

The control method according to any one of supplementary notes 8 to 11, wherein the data access control information is determined from any of data read authority, data write authority, data forwarding authority, data reception authority, data transmission authority, a terminal position, a remaining power level, a remaining storage capacity, a memory size, and a communication state, or a combination of pieces of the information.

<Supplementary Note 13>

A recording medium storing a control program, the program for causing a computer of a terminal device that reproduces and forwards data by a store-and-forward system to perform process for:

determining participation in each of a data forwarding network and a data utilizing network by managing network control information for network control and data access control information for data access control simultaneously with data.

<Supplementary Note 14>

The recording medium storing the control program according to supplementary note 13, the medium comprising a program for performing:

control information storage processing of storing the network control information and the data access control information in a pair in advance;

data storage processing of storing data, and the network control information and the data access control information in association with each other;

communication processing of adding the network control information to data received from another terminal and outputting the network control information and the data;

accumulation processing of determining whether the data is to be accumulated on the basis of the network control information recorded in the control information storage means and the network control information output from the communication means;

forwarding processing of obtaining, from the control information storage means, the data access control information corresponding to the network control information received from the communication means, and extracting data of a network to which the another terminal belongs from the data storage means on the basis of the obtained data access control information;

transmission processing of transmitting the data extracted by the forwarding means to the another terminal;

data processing of, in reading read data from the data storage means, reading the read data on the basis of the data access control information, and in writing write data into the data storage means, providing the write data with any pair of the network control information and the data access control information stored in the control information storage means; and network control processing of changing setting of the communication means on the basis of the network control information.

<Supplementary Note 15>

The recording medium storing the control program according to supplementary note 13, the medium comprising a program for performing:

control information storage processing of storing the network control information and the data access control information in a pair in advance;

data storage processing of storing data, and the network control information and the data access control information in association with each other;

communication processing of receiving, from another terminal, reception data provided with the network control information and the data access control information;

control information analysis processing of comparing the network control information received from the communication means with the network control information stored in the control information storage means and determining whether the reception data is to be output in accordance with a comparison result;

accumulation processing of determining whether the reception data is to be accumulated on the basis of the network control information recorded in the control information storage means and the network control information output from the control information analysis means;

forwarding processing of obtaining from the control information storage means, the data access control information corresponding to the network control information received from the control information analysis means, and extracting data of a network to which the another terminal belongs from the data storage means on the basis of the obtained data access control information;

control information generation processing of adding the network control information and the data access control information to the data extracted by the forwarding means to generate a format of transmission data;

transmission processing of transmitting the transmission data generated by the control information generation means to the another terminal; and data processing of, in reading read data from the data storage means, reading the read data on the basis of the data access control information, and in writing write data in the data storage means, providing the write data with any pair of the network control information and the data access control information stored in the control information storage means.

<Supplementary Note 16>

The recording medium storing the control program according to any one of supplementary notes 13 to 15, wherein the network control information is determined from any of a network identifier, an SSID of a wireless LAN, a ZigBee PAN identifier, port numbers of a router and a switch, a terminal position, a remaining power level, a remaining storage capacity, a memory size, and a communication state, or a combination of pieces of information thereof.

<Supplementary Note 17>

The recording medium storing the control program according to any one of supplementary notes 13 to 16, wherein the data access control information is determined from any of data read authority, data write authority, data forwarding authority, data reception authority, data transmission authority, a terminal position, a remaining power level, a remaining storage capacity, a memory size, and a communication state, or a combination of pieces of information thereof.

Note that the present invention is not limited to the above-described exemplary embodiments, and may be changed as appropriate by those skilled in the art without departing from the gist of the invention.

Although the present invention has been described above with reference to exemplary embodiments, the present invention is not limited to the above-described exemplary embodiments. Various changes which would be understood by those skilled in the art may be made to the configurations and details of the present invention within the scope of the present invention.

This application claims priority based on Japanese Patent Application No. 2014-150041 filed on Jul. 23, 2014, the disclosure of which is incorporated herein in its entirety.

REFERENCE SIGNS LIST

1000 Terminal
1010 Communication unit

1020 Network control unit
1030 Reception processing unit
1040 Transmission processing unit
1050 Control information storage unit
1060 Accumulation processing unit
1070 Forwarding processing unit
1080 Data storage unit
1090 Data processing unit
2000 Terminal
2010 Communication unit
2030 Reception processing unit
2040 Transmission processing unit
2050 Control information storage unit
2060 Accumulation processing unit
2070 Forwarding processing unit
2080 Data storage unit
2090 Data processing unit
2100 Control information analysis unit
2200 Control information generation unit

What is claimed is:

1. A terminal device that reproduces and forwards data by a store-and-forward system, wherein
the device determines participation in each of a data forwarding network and a data utilizing network by managing network control information for network control and data access control information for data access control in combination for data,
and wherein the device comprises:
a processor;
a non-transitory computer-readable data storage medium storing code executable by the processor to:
store the network control information and the data access control information in a pair in advance;
store data, and the network control information and the data access control information in association with each other;
add the network control information to data received from another terminal and output the network control information and the data;
determine whether the data is to be accumulated on the basis of the network control information recorded and the network control information output;
obtain the data access control information corresponding to the network control information, and extract data of a network to which the another terminal belongs on the basis of the obtained data access control information;
transmit the extracted data to the another terminal;
in reading read data, read the read data on the basis of the data access control information, and writing write data, provide the write data with any pair of the network control information and the data access control information stored in the control information stored; and
change a communication setting on the basis of the network control information.

2. The terminal device according to claim 1, wherein the code is executable by the processor to further:
store the network control information and the data access control information in a pair in advance;
store data, and the network control information and the data access control information in association with each other;
receive from another terminal, reception data provided with the network control information and the data access control information;
compare the network control information with the network control information and determine whether the reception data is to be output in accordance with a comparison result;
determine whether the reception data is to be accumulated on the basis of the network control information and the network control information;
obtain the data access control information corresponding to the network control information, and extract data of a network to which the another terminal belongs on the basis of the obtained data access control information;
add the network control information and the data access control information to the extracted data to generate a format of transmission data;
transmit the transmission data to the another terminal; and
read, in reading read data, the read data on the basis of the data access control information, and in writing write data, providing the write data with any pair of the network control information and the data access control information.

3. The terminal device according to claim 1, wherein the network control information is determined from any of a network identifier, an SSID of a wireless LAN, a ZigBee PAN identifier, port numbers of a router and a switch, a terminal position, a remaining power level, a remaining storage capacity, a memory size, and a communication state, or a combination thereof.

4. The terminal device according to claim 1, wherein the data access control information is determined from any of data read authority, data write authority, data forwarding authority, data reception authority, data transmission authority, a terminal position, a remaining power level, a remaining storage capacity, a memory size, and a communication state, or a combination the pieces of the information.

5. A communication system comprising:
the terminal device according to claim 1; and
a control information distribution server comprising hardware, including a processor and memory, to generate the network control information and the data access control information on the basis of user information and service information; to store the generated network control information and the data access control information; and to read and distribute the network control information and the data access control information stored to the terminal device.

6. The communication system according to claim 5, wherein the control information distribution server further is to display predetermined information obtained by processing the generated network control information and the data access control information.

7. A control method for controlling a terminal device that reproduces and forwards data by a store-and-forward system, the method comprising:
determining participation in each of a data forwarding network and a data utilizing network by managing network control information for network control and data access control information for data access control in combination for data;
storing the network control information and the data access control information in a pair in advance;
storing data, and the network control information and the data access control information in association with each other;
adding the network control information to data received from another terminal and outputting the network control information and the data;

determining whether the data is to be accumulated on the basis of the network control information recorded and the network control information output;

obtaining the data access control information corresponding to the network control information received, and extracting data of a network to which the another terminal belongs on the basis of the obtained data access control information;

transmitting the data extracted to the another terminal;

in reading read data, reading the read data on the basis of the data access control information, and in writing write data, providing the write data with any pair of the network control information and the data access control information stored; and changing setting on the basis of the network control information.

8. The control method according to claim 7, further comprising:

storing the network control information and the data access control information in a pair in advance;

storing data, and the network control information and the data access control information in association with each other;

receiving, from another terminal, reception data provided with the network control information and the data access control information;

comparing the network control information received with the network control information stored and determining whether the reception data is to be output in accordance with a comparison result;

determining whether the reception data is to be accumulated on the basis of the network control information recorded and the network control information output;

obtaining the data access control information corresponding to the network control information received, and extracting data of a network to which the another terminal belongs on the basis of the obtained data access control information;

adding the network control information and the data access control information to the data extracted to generate a format of transmission data;

transmitting the transmission data generated to the another terminal; and in reading read data, reading the read data on the basis of the data access control information, and in writing write data, providing the write data with any pair of the network control information and the data access control information stored.

9. The control method according to claim 7, wherein the network control information is determined from any of a network identifier, an SSID of a wireless LAN, a ZigBee PAN identifier, port numbers of a router and a switch, a terminal position, a remaining power level, a remaining storage capacity, a memory size, and a communication state, or a combination of pieces of information thereof.

10. The control method according to claim 7, wherein the data access control information is determined from any of data read authority, data write authority, data forwarding authority, data reception authority, data transmission authority, a terminal position, a remaining power level, a remaining storage capacity, a memory size, and a communication state, or a combination of pieces of the information.

11. A non-transitory computer-readable recording medium storing a control program, the program for causing a computer of a terminal device that reproduces and forwards data by a store-and-forward system to perform processes for:

determining participation in each of a data forwarding network and a data utilizing network by managing network control information for network control and data access control information for data access control in combination for data;

storing the network control information and the data access control information in a pair in advance;

storing data, and the network control information and the data access control information in association with each other;

adding the network control information to data received from another terminal and outputting the network control information and the data;

determining whether the data is to be accumulated on the basis of the network control information recorded and the network control information output;

obtaining the data access control information corresponding to the network control information received, and extracting data of a network to which the another terminal belongs on the basis of the obtained data access control information;

transmitting the data extracted to the another terminal;

in reading read data, reading the read data on the basis of the data access control information, and in writing write data, providing the write data with any pair of the network control information and the data access control information stored; and changing setting on the basis of the network control information.

12. The recording medium according to claim 11, wherein the program causes the computer to perform further processes for:

storing the network control information and the data access control information in a pair in advance;

storing data, and the network control information and the data access control information in association with each other;

receiving, from another terminal, reception data provided with the network control information and the data access control information;

comparing the network control information received with the network control information stored and determining whether the reception data is to be output in accordance with a comparison result;

determining whether the reception data is to be accumulated on the basis of the network control information recorded and the network control information output;

obtaining the data access control information corresponding to the network control information received, and extracting data of a network to which the another terminal belongs on the basis of the obtained data access control information;

adding the network control information and the data access control information to the data extracted to generate a format of transmission data;

transmitting the transmission data generated to the another terminal; and in reading read data, reading the read data on the basis of the data access control information, and in writing write data, providing the write data with any pair of the network control information and the data access control information stored.

13. The recording medium according to claim 11, wherein the network control information is determined from any of a network identifier, an SSID of a wireless LAN, a ZigBee PAN identifier, port numbers of a router and a switch, a terminal position, a remaining power level, a remaining storage capacity, a memory size, and a communication state, or a combination of pieces of information thereof.

14. The recording medium according to claim 11, wherein the data access control information is determined from any of data read authority, data write authority, data forwarding authority, data reception authority, data transmission authority, a terminal position, a remaining power level, a remaining storage capacity, a memory size, and a communication state, or a combination of pieces of information thereof.

* * * * *